United States Patent
Li et al.

(10) Patent No.: US 12,527,507 B2
(45) Date of Patent: Jan. 20, 2026

(54) ELECTROCARDIOGRAM DETECTION DEVICE AND DETECTION CIRCUIT

(71) Applicant: HUAWEI TECHNOLOGIES CO., LTD., Guangdong (CN)

(72) Inventors: Deng Li, Dongguan (CN); Yi Hu, Hangzhou (CN); Yumin Liu, Dongguan (CN); Yi Xi, Dongguan (CN); Hao Zhang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 399 days.

(21) Appl. No.: 18/063,746

(22) Filed: Dec. 9, 2022

(65) Prior Publication Data

US 2023/0106329 A1     Apr. 6, 2023

Related U.S. Application Data

(63) Continuation of application No. PCT/CN2021/099167, filed on Jun. 9, 2021.

Foreign Application Priority Data

Jun. 12, 2020 (CN) .......................... 202010538235.1

(51) Int. Cl.
*A61B 5/282*     (2021.01)
*A61B 5/00*      (2006.01)
*A61B 5/308*     (2021.01)

(52) U.S. Cl.
CPC .............. *A61B 5/282* (2021.01); *A61B 5/308* (2021.01); *A61B 5/681* (2013.01)

(58) Field of Classification Search
CPC .......... A61B 5/28; A61B 5/282; A61B 5/681; A61B 5/7214
See application file for complete search history.

(56) References Cited

U.S. PATENT DOCUMENTS

| | | | |
|---|---|---|---|
| 11,751,790 B1* | 9/2023 | Patel .................... | A61B 5/6826 600/384 |
| 2009/0312656 A1* | 12/2009 | Lau ..................... | A61B 5/02438 600/509 |

(Continued)

OTHER PUBLICATIONS

Analogdevices: "Datasheet AD8233-50 A, 2 mm×1.7 mm WLCSP, Low Noise, Heart Rate Monitor for Wearable Products", Analog Devices Datasheet AD8233, Aug. 25, 2016 (Aug. 25, 2016), XP093077821, total 32 pages.

(Continued)

*Primary Examiner* — Eun Hwa Kim

(57) ABSTRACT

An electrocardiogram detection device whose housing may be made of a conductive material, and the electrocardiogram detection device may include a voltage holder circuit configured to provide a target potential for the housing. A potential difference between the target potential provided by the voltage holder circuit and a reference potential provided by an electrocardiogram detection circuit for a third electrode is small. Therefore, in an ECG detection process, even if a user accidentally touches the housing and causes the housing to be conducted to the third electrode, no leakage current is generated between the housing and the third electrode, or a small leakage current is generated between the housing and the third electrode. This can effectively reduce interference to an ECG signal and ensure accuracy of ECG detection.

20 Claims, 16 Drawing Sheets

(56) References Cited

U.S. PATENT DOCUMENTS

2019/0072912 A1 3/2019 Pandya et al.
2020/0064774 A1 2/2020 Ely et al.

OTHER PUBLICATIONS

Extended European Search Report dated Sep. 11, 2023, issued for European Application No. 21821452.6 (12 pages).

* cited by examiner

ELECTROCARDIOGRAM DETECTION DEVICE AND DETECTION CIRCUIT

CROSS-REFERENCE TO RELATED APPLICATIONS

This application is a continuation of International Application No. PCT/CN2021/099167, filed on Jun. 9, 2021, which claims priority to Chinese Patent Application No. 202010538235.1, filed on Jun. 12, 2020. The disclosures of the aforementioned applications are hereby incorporated by reference in their entireties.

TECHNICAL FIELD

This disclosure relates to the field of electronic technologies, and in particular, to an electrocardiogram detection device and detection circuit.

BACKGROUND

With development of technologies, functions of wearable devices are increasingly diversified. Currently, the wearable devices such as a smartwatch (or a smart band) usually have an electrocardiogram (ECG) detection function.

In a related technology, an ECG detection circuit may be integrated into the smartwatch, and the ECG detection circuit may be separately connected to a left arm (LA) electrode, a right arm (RA) electrode, and a right leg (RL) electrode. The ECG detection circuit may collect an ECG signal of a user by using the LA electrode and the RA electrode, and may provide a reference potential for the user by using the RL electrode, to ensure detection reliability. The LA electrode and the RL electrode are usually disposed on an outer side of a bottom cover of the smartwatch, that is, a side on which the bottom cover is in contact with skin of the user. The RA electrode is usually disposed on a watch housing of the smartwatch. When the left hand of the user wears the smartwatch, the LA electrode and the RL electrode may be in contact with the skin of the user. If the user needs to perform ECG detection, the user may touch the RA electrode by using the right hand. In this case, the ECG circuit may collect the ECG signal of the user and perform ECG detection.

When the watch housing of the smartwatch is made of metal, to ensure anti-electromagnetic interference and anti-static performance of the smartwatch, the metal watch housing is grounded. Therefore, if the right hand of the user accidentally touches the metal watch housing when touching the RA electrode to perform ECG detection, the RL electrode forms a current path with the metal watch housing through the human body. Because there is a potential difference between the RL electrode and the metal watch housing, a path of a leakage current is formed between the RL electrode and the metal watch housing, and the leakage current affects accuracy of ECG detection.

SUMMARY

This disclosure provides an electrocardiogram detection device and detection circuit, to resolve a problem in the related technology that a leakage current generated in a metal housing affects accuracy of ECG detection. Technical solutions are as follows.

According to one aspect, an electrocardiogram detection device is provided. The device may include a housing made of a conductive material, an electrocardiogram detection circuit and a voltage holder circuit that are disposed in the housing, and a first electrode, a second electrode, and a third electrode that are disposed outside the housing and insulated from the housing. The three electrodes are in contact with skin of a user. The electrocardiogram detection circuit may be separately connected to the first electrode, the second electrode, and the third electrode. The electrocardiogram detection circuit is configured to collect an electrocardiogram signal by using the first electrode and the second electrode, and provide a reference potential for the third electrode. The voltage holder circuit is connected to the housing, and is configured to provide a target potential for the housing. A potential difference between the target potential and the reference potential is less than a difference threshold. The potential difference between the target potential provided by the voltage holder circuit and the reference potential provided by the electrocardiogram detection circuit for the third electrode is small. Therefore, in an ECG detection process, even if the user accidentally touches the housing and causes the housing to be conducted to the third electrode, no leakage current is generated between the housing and the third electrode or a small leakage current is generated between the housing and the third electrode. This can effectively reduce interference to an ECG signal and ensure accuracy of ECG detection.

In an implementation, an output end of the voltage holder circuit is connected to the housing, an input end of the voltage holder circuit is connected to a potential provider, and the voltage holder circuit is configured to output the target potential at the output end based on an input signal of the input end. Because the voltage holder circuit may output the target potential at the output end based on the signal input at the input end of the voltage holder circuit, and the potential difference between the target potential and the reference potential of the third electrode is small, the leakage current between the housing and the third electrode can be effectively suppressed, and accuracy of ECG detection can be ensured.

In an implementation, the potential provider is the third electrode, or the second electrode, or the first electrode, or a power supply output end. When the potential provider is the third electrode, this can ensure that the target potential provided by the voltage holder circuit for the housing is approximately equal to the reference potential of the third electrode. This can effectively suppress the leakage current. When the potential provider is the second electrode or the first electrode, because a potential difference between potentials of the two electrodes and the reference potential of the third electrode is small, the leakage current between the third electrode and the housing can also be effectively reduced. When the potential provider is the power supply output end, a potential of the power supply output end may be properly designed, so that the target potential provided by the voltage holder circuit for the housing is approximately equal to the reference potential. This can ensure suppression on the leakage current.

In an implementation, the potential provider is the third electrode, or the second electrode, or the first electrode. The voltage holder circuit is a voltage follower circuit. An output end of the voltage follower circuit serves as the output end of the voltage holder circuit and is connected to the housing. An input end of the voltage follower circuit serves as the input end of the voltage holder circuit and is connected to the potential provider. The voltage follower circuit is configured to control a potential of the housing to be substantially consistent with the target potential of the potential provider. By using the voltage follower circuit, the potential of the housing may be substantially consistent with the target potential of the third electrode, the second electrode, or the first electrode. This can effectively suppress the leakage current.

The voltage follower circuit may include a first operational amplifier. An in-phase input end of the first operational amplifier serves as the input end of the voltage follower circuit and is connected to the potential provider. An output end of the first operational amplifier serves as the output end of the voltage follower circuit and is separately connected to the housing and an out-of-phase input end of the first operational amplifier. Voltage following can be achieved by connecting the output end of the operational amplifier to the out-of-phase input end. In addition, because an input resistance of the first operational amplifier is high (the input resistance is infinite in an ideal case), impact on the potential of the potential provider can be avoided, and it is ensured that the electrocardiogram detection circuit can run normally.

In an implementation, the voltage follower circuit may further include a plurality of cascaded first operational amplifiers. Alternatively, the voltage follower circuit may include a plurality of cascaded discrete triodes. These circuits can also achieves effect similar to that of an operational amplifier, and it is ensured that the electrocardiogram detection circuit can run normally.

In an implementation, the potential provider is the power supply output end. The voltage holder circuit is a voltage regulator circuit. An input end of the voltage regulator circuit serves as the input end of the voltage holder circuit and is connected to the power supply end. An output end of the voltage regulator circuit serves as the output end of the voltage holder circuit and is connected to the housing. The voltage regulator circuit is configured to provide the target potential for the housing under driving of the power supply end. The target potential provided by the voltage regulator circuit may be equal to a potential of a reference power supply end connected to a right leg drive sub-circuit. Therefore, this can ensure that the potential difference between the target potential and the reference potential provided by the right leg drive sub-circuit for the third electrode is small. This can effectively suppress the leakage current.

In an implementation, the voltage regulator circuit may be a low dropout regulator (LDO). The LDO has advantages such as low noise and a small static current.

In an implementation, the target potential is equal to or close to the reference potential, so that the leakage current between the housing and the third electrode can be effectively suppressed.

In an implementation, the electrocardiogram detection device may further include a resistor connected in series between the housing and the voltage holder circuit. The resistor may further increase a resistance on a path of the leakage current. In this way, the leakage current can be effectively reduced.

In an implementation, the electrocardiogram detection device may further include a capacitor connected in parallel to the resistor. The capacitor can ensure anti-electromagnetic interference and antistatic performance of the electrocardiogram detection device.

In an implementation, the electrocardiogram detection device may further include an ESD circuit disposed in the housing. One end of the ESD circuit is connected to the housing, and the other end is grounded. The ESD circuit can prevent each electronic component in the electrocardiogram detection device from being damaged by electrostatic.

The ESD circuit may include a transient voltage suppressor (TVS). One electrode of the TVS is connected to the housing, and the other electrode of the TVS is grounded. As a high-efficiency protection device, the TVS has advantages of a fast response, a high transient power, a small leakage current, a small breakdown voltage deviation, easy control of clamping voltage, no damage limit, and a small size.

In an implementation, the electrocardiogram detection circuit may include a detection sub-circuit and the right leg drive sub-circuit. A first input end of the detection sub-circuit is connected to the first electrode. A second input end of the detection sub-circuit is connected to the second electrode. A common-mode output end of the detection sub-circuit is connected to a first input end of the right leg drive sub-circuit. The detection sub-circuit is configured to collect an electrocardiogram signal, and output a common-mode voltage between the first input end and the second input end to the right leg drive sub-circuit. A second input end of the right leg drive sub-circuit is connected to the reference power supply end. An output end of the right leg drive sub-circuit is connected to the third electrode. The right leg drive sub-circuit is configured to provide a reference potential for the third electrode under driving of the common-mode voltage and the reference power supply end. The potential provider is the third electrode, or the second electrode, or the first electrode, or the common-mode output end. When the potential provider is the third electrode, this can ensure that the target potential provided by the voltage holder circuit for the housing is approximately equal to the reference potential of the third electrode. This can effectively suppress the leakage current. When the potential provider is the second electrode, or the first electrode, or the common-mode output end, because a potential difference between potentials of the three terminals and the reference potential is small, the leakage current between the third electrode and the housing can also be effectively reduced.

In an implementation, the detection sub-circuit may include an instrumentation amplifier, an analog-to-digital converter, and a processor. The right leg drive sub-circuit may include a second operational amplifier. An out-of-phase input end of the instrumentation amplifier serves as the first input end of the detection sub-circuit and is connected to the first electrode. An in-phase input end of the instrumentation amplifier serves as the second input end of the detection sub-circuit and is connected to the second electrode. A common-mode output end of the instrumentation amplifier serves as the common-mode output end of the detection sub-circuit and is connected to an out-of-phase input end of the second operational amplifier. A differential-mode output end of the instrumentation amplifier is connected to an input end of the analog-to-digital converter. The out-of-phase input end of the second operational amplifier is the first input end of the right leg drive sub-circuit. An output end of the analog-to-digital converter is connected to the processor. An in-phase input end of the second operational amplifier serves as the second input end of the right leg drive sub-circuit and is connected to the reference power supply end. An output end of the second operational amplifier serves as the output end of the right leg drive sub-circuit and is connected to the third electrode. As an improved structure of a differential amplifier, the instrumentation amplifier has advantages such as a low direct-current offset, a low drift, low noise, a high open-loop gain, a larger common-mode rejection ratio, and a high input impedance, and can be applied to an electrocardiogram detection circuit that has a high requirement on accuracy and stability.

In an implementation, the electrocardiogram detection device further includes a positive power supply circuit disposed in the housing. The positive power supply circuit has a power supply output end. The positive power supply circuit is configured to supply power to the electrocardiogram detection circuit and the voltage holder circuit by using the power supply output end. Because a circuit structure of the positive power supply circuit is simple and costs are low, the positive power supply circuit is used in the electrocardiogram detection device. This can effectively reduce complexity of the circuit structure of the electrocardiogram detection device and costs of the entire system.

In an implementation, the electrocardiogram detection device further includes a voltage conversion circuit. The voltage conversion circuit is separately connected to the power supply output end and the reference power supply end. The voltage conversion circuit may convert a potential output by the power supply output end and then provide the converted potential to the reference power supply end, so that the potential output by the reference power supply end is equal to half of the potential output by the power supply output end. The voltage conversion circuit may be disposed to convert a voltage output by the power supply output end, to ensure that the reference power supply end can provide a proper potential for the in-phase input end of the second operational amplifier.

In an implementation, the electrocardiogram detection device may be a wearable device, and the wearable device may be a watch or a band. The wearable device such as the watch or the band is used as the electrocardiogram detection device, so that the user can detect an electrocardiogram signal of the user in real time. This improves flexibility of electrocardiogram signal detection.

According to another aspect, a detection circuit applied to an electrocardiogram detection device is provided. The electrocardiogram detection device includes a housing made of a conductive material. The detection circuit includes a first input pin, a second input pin, a first output pin, and a second output pin. The first input pin is configured to connect to a first electrode. The second input pin is configured to connect to a second electrode. The first output pin is configured to connect to a third electrode. The detection circuit is configured to collect an electrocardiogram signal by using the first input pin and the second input pin, and provide a reference potential for the third electrode by using the first output pin. The first electrode, the second electrode, and the third electrode are all disposed outside the housing and insulated from the housing. The second output pin is configured to connect to the housing of the electrocardiogram detection device. The detection circuit is further configured to provide a target potential for the housing by using the second output pin. A potential difference between the target potential and the reference potential is less than a difference threshold. Because the potential difference between the target potential provided by the detection circuit for the housing and the reference potential provided by the detection circuit for the third electrode is small, in an ECG detection process, no leakage current is generated between the housing and the third electrode, or a small leakage current is generated between the housing and the third electrode. This can effectively reduce interference to an ECG signal and ensure accuracy of ECG detection.

In an implementation, the detection circuit includes a voltage holder circuit. An output end of the voltage holder circuit is connected to the second output pin. An input end of the voltage holder circuit is configured to connect to a potential provider. The voltage holder circuit is configured to output the target potential at the output end based on an input signal of the input end.

In an implementation, the potential provider is the third electrode, or the second electrode, or the first electrode, or a power supply output end.

In an implementation, the potential provider is the third electrode, or the second electrode, or the first electrode. The voltage holder circuit is a voltage follower circuit. An output end of the voltage follower circuit serves as the output end of the voltage holder circuit and is connected to the second output pin. An input end of the voltage follower circuit serves as the input end of the voltage holder circuit and is configured to connect to the potential provider. The voltage follower circuit is configured to control a potential of the second output pin to be substantially consistent with the target potential of the potential provider.

In an implementation, the voltage follower circuit includes a first operational amplifier.

An in-phase input end of the first operational amplifier serves as the input end of the voltage follower circuit and is configured to connect to the potential provider. An output end of the first operational amplifier serves as the output end of the voltage follower circuit and is separately connected to the second output pin and an out-of-phase input end of the first operational amplifier.

In an implementation, the potential provider is the power supply output end. The detection circuit further includes a power supply pin. The power supply pin is configured to connect to the power supply output end. The voltage holder circuit is a voltage regulator circuit. An input end of the voltage regulator circuit serves as the input end of the voltage holder circuit and is connected to the power supply pin. An output end of the voltage regulator circuit serves as the output end of the voltage holder circuit and is connected to the second output pin. The voltage regulator circuit is configured to provide the target potential for the second output pin under driving of the power supply output end.

In an implementation, the voltage regulator circuit is a low dropout regulator.

In an implementation, the target potential is equal to or close to the reference potential.

In an implementation, the detection circuit further includes a resistor connected in series between the second output pin and the voltage holder circuit.

In an implementation, the detection circuit further includes a capacitor connected in parallel to the resistor.

In an implementation, the detection circuit further includes an ESD circuit. One end of the ESD circuit is connected to the second output pin, and the other end is grounded.

In an implementation, the ESD circuit includes a transient voltage suppressor. One electrode of the transient voltage suppressor is connected to the second output pin, and the other electrode of the transient voltage suppressor is grounded.

In an implementation, the detection circuit further includes a detection sub-circuit and a right leg drive sub-circuit. A first input end of the detection sub-circuit is connected to the first input pin. A second input end of the detection sub-circuit is connected to the second input pin. A common-mode output end of the detection sub-circuit is connected to a first input end of the right leg drive sub-circuit. The detection sub-circuit is configured to collect an electrocardiogram signal, and output a common-mode voltage between the first input end and the second input end to the right leg drive sub-circuit. A second input end of the right leg drive sub-circuit is connected to a reference power supply end. An output end of the right leg drive sub-circuit is connected to the first output pin. The right leg drive sub-circuit is configured to provide a reference potential for the third electrode under driving of the common-mode voltage and the reference power supply end. The potential provider is the third electrode, or the second electrode, or the first electrode, or the power supply output end, or the common-mode output end.

For beneficial effects of the foregoing implementations of the detection circuit provided in this disclosure, refer to beneficial effects of corresponding implementations in the electrocardiogram detection device. Details are not described herein again.

In an implementation, the detection circuit is an integrated circuit and is packaged into a single chip. The detection circuit is designed as the integrated circuit and packaged into the chip, so that a volume of the detection circuit can be reduced and the detection circuit can be applied to a small electrocardiogram detection device.

Embodiments of this disclosure provide an electrocardiogram detection device and detection circuit. A housing of the electrocardiogram detection device may be made of a conductive material. In addition, the electrocardiogram detection device may include a voltage holder circuit configured to provide a target potential for the housing. A potential difference between the target potential provided by the voltage holder circuit and a reference potential provided by the electrocardiogram detection circuit for a third electrode is small. Therefore, in an ECG detection process, even if a user accidentally touches the housing and causes the housing to be conducted to the third electrode, no leakage current is generated between the housing and the third electrode or a small leakage current is generated between the housing and the third electrode. This can effectively reduce interference to an ECG signal and ensure accuracy of ECG detection.

DESCRIPTION OF EMBODIMENTS

The following describes in detail an electrocardiogram detection device provided in an embodiment of this disclosure with reference to accompanying drawings.

Figure 1:
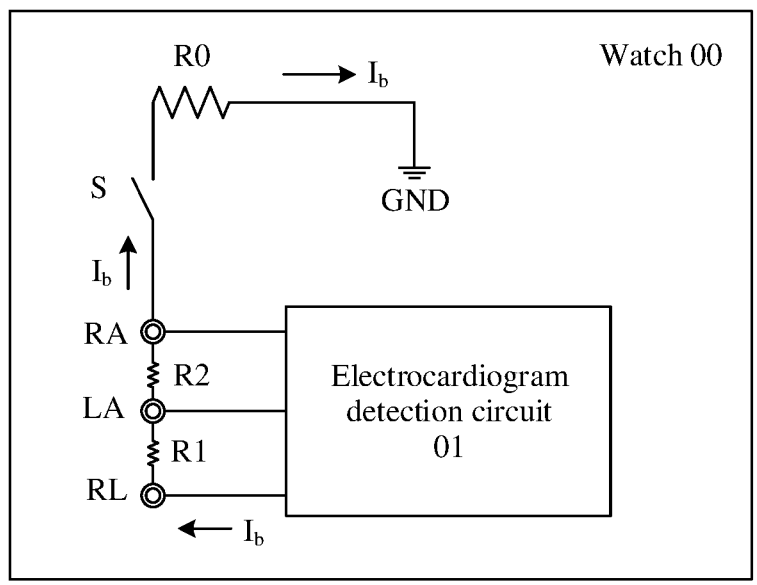
FIG. 1 is an equivalent circuit diagram of a watch having an ECG detection function in the related technology.

FIG. 1 is an equivalent circuit diagram of a watch having an ECG detection function in the related technology. As shown in FIG. 1, an electrocardiogram detection circuit 01 in the watch 00 may be separately connected to an RA electrode, an LA electrode, and an RL electrode. R0 in FIG. 1 is an equivalent resistance of a watch housing of the watch 00. It can be learned from FIG. 1 that the watch housing is grounded (GND). Because a surface of a watch housing made of a metal material is generally coated with an insulation material, to increase a resistance of the watch housing and prevent the metal material from being corroded and oxidized, the equivalent resistance R0 of the watch housing may be a sum of a resistance value of the metal material in the watch housing and a resistance value of the insulation material. In addition, because the resistance value of the metal material is small and may be ignored, the equivalent resistance R0 may be considered as a resistance of the insulation material coated on the surface of the watch housing.

When the left hand of a user wears the smartwatch 00, the LA electrode and the RL electrode may be in contact with skin of the user. If the user needs to perform ECG detection, the user may touch the RA electrode by using the right hand. In this case, the ECG circuit may collect an ECG signal of the user and perform ECG detection. If the right hand of the user accidentally touches the watch housing when touching the RA electrode, the RL electrode is conducted to the watch housing, that is, equivalent to that the switch S shown in FIG. 1 is turned on. Because the electrocardiogram detection circuit 01 may provide a reference potential for the RL electrode, and there is a potential difference between the reference potential and the watch housing, a path of a leakage current $I_b$ is generated between the RL electrode and the watch housing. After the leakage current $I_b$ flows through the human body, interference is caused to an ECG signal detected by the electrocardiogram detection circuit 01. As a result, a baseline drift occurs in the ECG generated by the electrocardiogram detection circuit 01. A resistor R1 shown in FIG. 1 may be considered as a human body internal resistance between the LA electrode and the RL electrode, and a resistor R2 may be considered as a human body internal resistance between the LA electrode and the RA electrode.

An embodiment of this disclosure provides an electrocardiogram detection device. A housing of the electrocardiogram detection device may be made of a conductive material. For example, the housing may be a metal housing made of a metal material. When the electrocardiogram detection device performs ECG detection, even if a finger of a user accidentally touches the housing of the electrocardiogram detection device, accuracy of ECG detection can be ensured. That is, the electrocardiogram detection device provided in this embodiment of this disclosure can effectively reduce impact on ECG detection caused when the finger of the user accidentally touches the housing.

Figure 2:
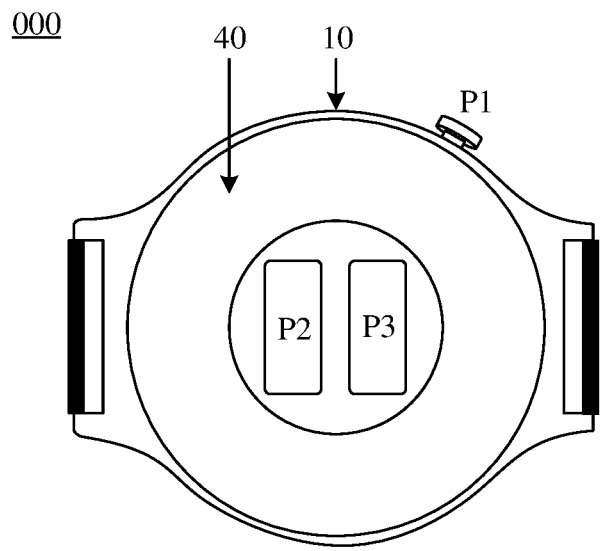
FIG. 2 is a schematic diagram of a structure of an electrocardiogram detection device according to an embodiment of this disclosure.
Figure 3:
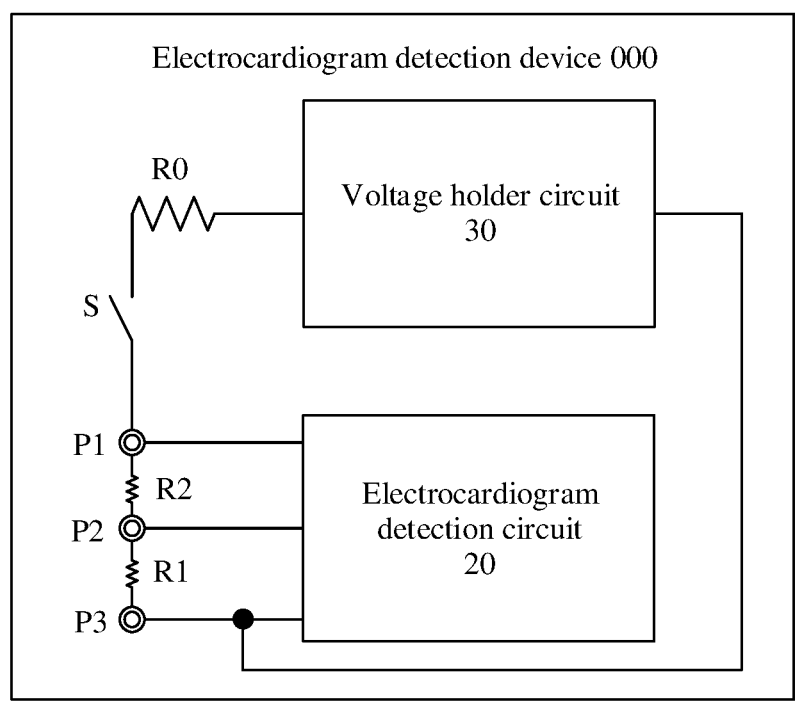
FIG. 3 is an equivalent circuit diagram of an electrocardiogram detection device according to an embodiment of this disclosure.

FIG. 2 is a schematic diagram of a structure of an electrocardiogram detection device according to an embodiment of this disclosure, and FIG. 3 is an equivalent circuit diagram of an electrocardiogram detection device according to an embodiment of this disclosure. As shown in FIG. 2 and FIG. 3, the electrocardiogram detection device 000 may include a housing 10 made of a conductive material, an electrocardiogram detection circuit 20 and a voltage holder circuit 30 that are disposed in the housing 10, and a first electrode P1, a second electrode P2, and a third electrode P3 that are disposed outside the housing 10 and insulated from the housing 10. The first electrode P1, the second electrode P2, and the third electrode P3 are exposed outside the housing 10, to facilitate contact with skin of a user.

The second electrode P2 and the third electrode P3 may be located on a first outer surface of the electrocardiogram detection device 000, the first electrode P1 may be located on a second outer surface of the electrocardiogram detection device 000, and the first outer surface and the second outer surface are different outer surfaces of the electrocardiogram detection device 000. For example, the electrocardiogram detection device 000 is a watch shown in FIG. 2. The first outer surface may be an outer surface of a bottom cover 40 of the watch, and the second outer surface may be an outer surface of the housing 10 (that is, a watch housing) of the watch. For example, refer to FIG. 2, the first electrode P1 may be disposed on a watch crown of the watch.

Refer to FIG. 3, the electrocardiogram detection circuit 20 may be separately connected to the first electrode P1, the second electrode P2, and the third electrode P3. The electrocardiogram detection circuit 20 may be configured to collect an electrocardiogram signal by using the first electrode P1 and the second electrode P2, and provide a reference potential for the third electrode P3.

After the skin of the user is in contact with the third electrode P3, the electrocardiogram detection circuit 20 may provide the reference potential for the human body by using the third electrode P3. This ensures reliability of the electrocardiogram signal collected by the electrocardiogram detection circuit 20 by using the first electrode P1 and the second electrode P2.

The voltage holder circuit 30 is connected to the housing 10 (the housing 10 is equivalent to a resistor R0 in FIG. 3). The connection may be a direct connection or an indirect connection. That is, the voltage holder circuit 30 may alternatively be connected to the housing 10 by using another electronic component (for example, a resistor). The voltage holder circuit 30 is configured to provide a target potential for the housing 10. A potential difference between the target potential and the reference potential is less than a difference threshold. That is, the voltage holder circuit 30 may enable a potential of the housing 10 to be equal to or approximately equal to the reference potential.

In this embodiment of this disclosure, when process precision and a performance loss of an electronic component are not considered, a smaller difference threshold is better. In an actual application, the difference threshold may be flexibly set based on a requirement of an actual application scenario when process precision permits. For example, an order of magnitude of the difference threshold may be a microvolt (uv) level or a millivolt (mv) level.

In an implementation, the target potential is equal to or close to the reference potential. The target potential being equal to or close to the reference potential means that the potential difference between the target potential and the reference potential is controlled within an error range allowed by engineering specifications. The target potential and the reference potential may be the same or close, that is, may be completely the same. However, because it is difficult to implement in practice, it may not be required that the target potential and the reference potential be completely the same, and a specific error may be allowed. For example, if a voltage difference between the target potential and the reference potential is a specific value (for example, 10 uv), but a leakage current can be suppressed at this time, and the potential difference meets engineering specification requirements of the product, this design is also acceptable. Generally, an order of magnitude of the error range may be an uv level or an mv level.

In conclusion, an embodiment of this disclosure provides an electrocardiogram detection device. A housing of the electrocardiogram detection device may be made of a conductive material. In addition, the electrocardiogram detection device may include a voltage holder circuit configured to provide a target potential for the housing. A potential difference between the target potential provided by the voltage holder circuit and a reference potential provided by the electrocardiogram detection circuit for a third electrode is small. Therefore, in an ECG detection process, even if a user accidentally touches the housing and causes the housing to be conducted to the third electrode, no leakage current is generated between the housing and the third electrode or a small leakage current is generated between the housing and the third electrode. This can effectively reduce interference to an ECG signal and ensure accuracy of ECG detection.

In addition, in the solution provided in this embodiment of this disclosure, a requirement on insulation performance of the housing of the electrocardiogram detection device is low. That is, a requirement on insulation performance of an insulation material coated on a surface of the housing is low. Therefore, a higher-cost process is not required to achieve better insulation performance of the housing. This avoids an increase in the production cost of the housing.

In this embodiment of this disclosure, the first electrode P1, the second electrode P2, and the third electrode P3 may all be dry electrodes. The dry electrode is an electrode that does not need to be used with a conductive paste. When ECG detection is performed by using the dry electrode, user experience is good, detection efficiency is high, and the dry electrode can be applied to a real-time health monitoring scenario.

In this embodiment of this disclosure, the voltage holder circuit 30 may include an output end, and the output end is connected to the housing 10. The voltage holder circuit 30 may include one or more input ends. The one or more input ends are connected to one or more potential providers in a one-to-one correspondence. The voltage holder circuit 30 is configured to output the target potential at the output end of the voltage holder circuit 30 based on an input signal of the input end of the voltage holder circuit 30. That is, the voltage holder circuit 30 may output the target potential after processing received one or more input signals.

In this embodiment of this disclosure, there is one potential provider, and may specifically be the third electrode P3, or the second electrode P2, or the first electrode P1, or a power supply output end. For example, refer to FIG. 3, the potential provider is the third electrode P3.

Figure 4:
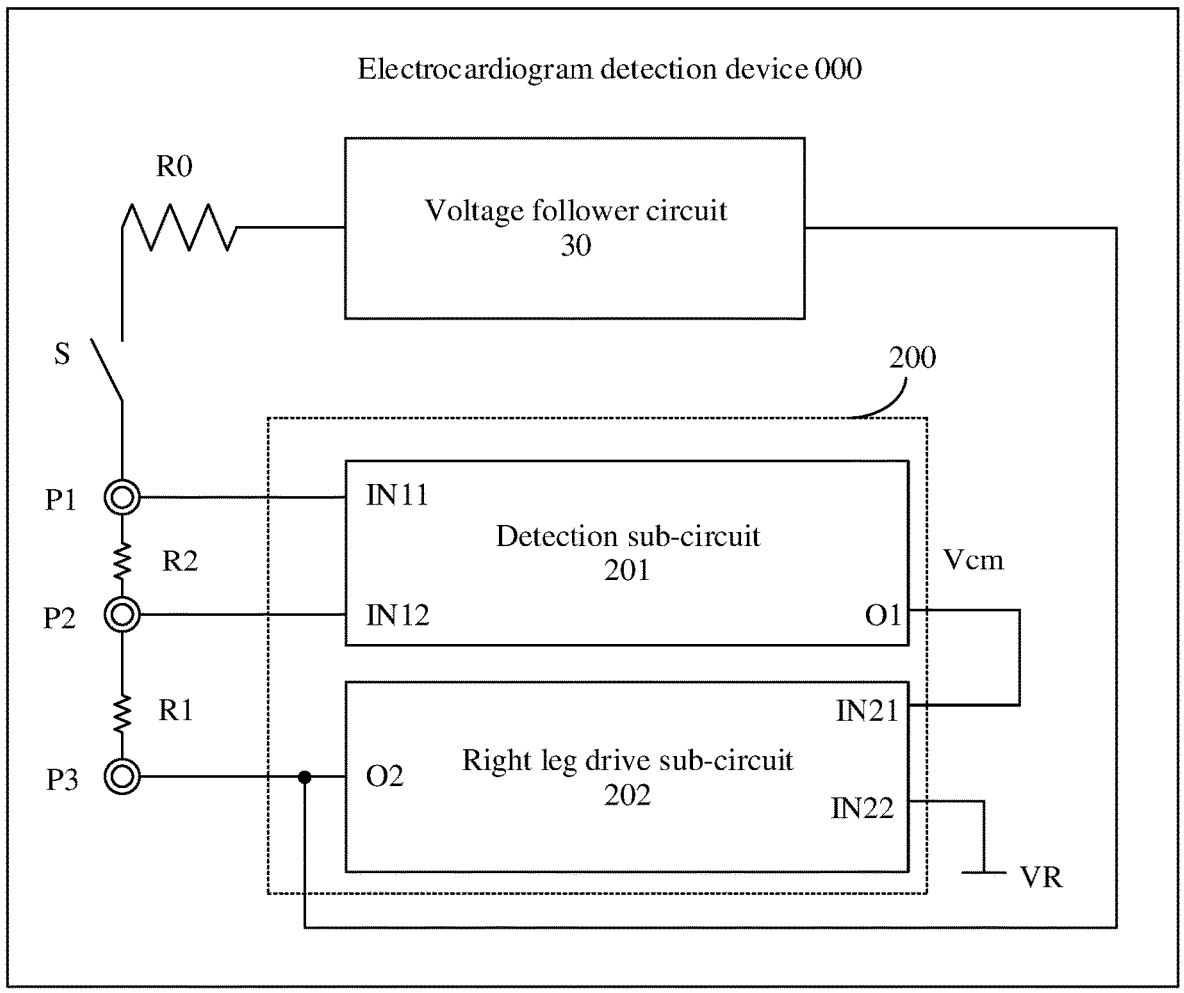
FIG. 4 is an equivalent circuit diagram of another electrocardiogram detection device according to an embodiment of this disclosure.

FIG. 4 is an equivalent circuit diagram of another electrocardiogram detection device according to an embodiment of this disclosure. As shown in FIG. 4, the electrocardiogram detection circuit 20 may include a detection sub-circuit 201 and a right leg drive sub-circuit 202.

A first input end IN11 of the detection sub-circuit 201 is connected to the first electrode P1. A second input end IN12 of the detection sub-circuit 201 is connected to the second electrode P2. A common-mode output end O1 of the detection sub-circuit 201 is connected to a first input end IN21 of the right leg drive sub-circuit 202. The detection sub-circuit 201 is configured to collect an electrocardiogram signal, and output a common-mode voltage Vcm between the first input end IN11 and a second input end IN22 to the right leg drive sub-circuit 202.

The second input end IN22 of the right leg drive sub-circuit 202 is connected to a reference power supply end VR. An output end O2 of the right leg drive sub-circuit 202 is connected to the third electrode P3. The right leg drive sub-circuit 202 is configured to provide a reference potential for the third electrode P3 under driving of the common-mode voltage Vom and the reference power supply end VR.

In this embodiment of this disclosure, the right leg drive sub-circuit 202 serves as a negative feedback circuit, and can provide a reference potential for the third electrode after inverting and amplifying a received common-mode voltage, to eliminate common-mode interference of a human body.

Figure 5:
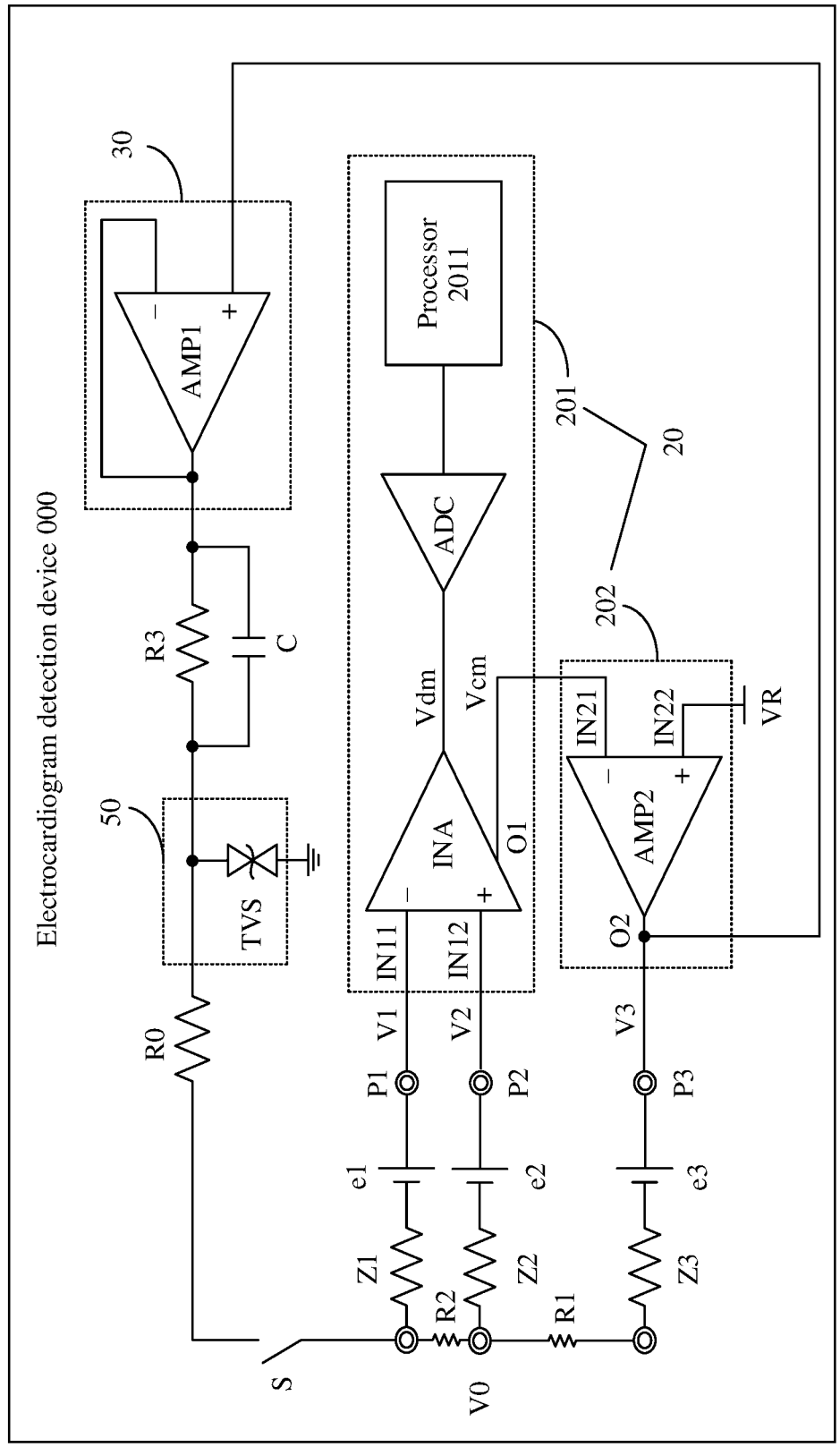
FIG. 5 is an equivalent circuit diagram of still another electrocardiogram detection device according to an embodiment of this disclosure.

FIG. 5 is an equivalent circuit diagram of still another electrocardiogram detection device according to an embodiment of this disclosure. Refer to FIG. 5, the detection sub-circuit 201 may include an instrumentation amplifier (INA), an analog-to-digital converter (ADC), and a processor 2011. The right leg drive sub-circuit 202 may include a second operational amplifier AMP2.

An out-of-phase input end of the INA serves as a first input end IN11 of the detection sub-circuit 201, and may be connected to the first electrode P1. An in-phase input end of the INA serves as a second input end IN12 of the detection sub-circuit 201, and may be connected to the second electrode P2. A common-mode output end of the INA serves as a common-mode output end O1 of the detection sub-circuit 201, and may be connected to an out-of-phase input end of the second operational amplifier AMP2 (that is, a first input end IN21 of the right leg drive sub-circuit 202), and a differential-mode output end of the INA may be connected to an input end of the ADC.

The INA may collect a potential of the in-phase input end and a potential of the out-of-phase input end of the INA, output a differential-mode voltage Vdm (the differential-mode voltage Vdm is an ECG signal) between the in-phase input end and the out-of-phase input end by using the differential-mode output end, and output a common-mode voltage Vcm between the in-phase input end and the out-of-phase input end by using the common-mode output end.

As an improved structure of a differential amplifier, the INA has advantages such as a low direct-current offset, a low drift, low noise, a high open-loop gain, a larger common-mode rejection ratio, and a high input impedance, and can be applied to an electrocardiogram detection circuit 20 that has a high requirement on accuracy and stability.

An output end of the ADC is connected to the processor 2011. The ADC is configured to: perform analog-to-digital conversion on the differential-mode voltage Vdm output by the INA to obtain a digital signal, and send the digital signal to the processor 2011. The processor 2011 may further process the digital signal to generate an ECG.

The processor 2011 may be a micro-controller unit (MCU), or may be a digital signal processor (DSP), or various other processing circuits having a signal processing capability.

An in-phase input end of the second operational amplifier AMP2 serves as a second input end IN22 of the right leg drive sub-circuit 202 and is connected to a reference power supply end VR. An output end of the second operational amplifier AMP2 serves as an output end O2 of the right leg drive sub-circuit 202 and is connected to the third electrode P3.

It should be noted that, in addition to the INA, the ADC, and the processor 2011, the detection sub-circuit 201 may further include another electronic component, for example, may further include a filter or another functional circuit. In addition to one second operational amplifier AMP2, the right leg drive sub-circuit 202 may further include electronic components such as a resistor and a capacitor, or may further include another operational amplifier cascaded to the second operational amplifier AMP2. Circuit structures of the detection sub-circuit 201 and the right leg drive sub-circuit 202 are not limited in this embodiment of this disclosure.

In this embodiment of this disclosure, the electrocardiogram detection device 000 may supply power to each electronic component by using a positive power supply circuit. The positive power supply circuit has a power supply output end VCC configured to provide a system positive potential Vcc for the electrocardiogram detection circuit. Correspondingly, a positive power supply electrode of each electronic component may be connected to the power supply output end VCC, and a negative power supply electrode may be directly grounded. In some documents or products, this power supply mode is also called single-power supply mode, which is different from the dual-power supply mode in which both positive and negative power supplies are used.

Figure 6:
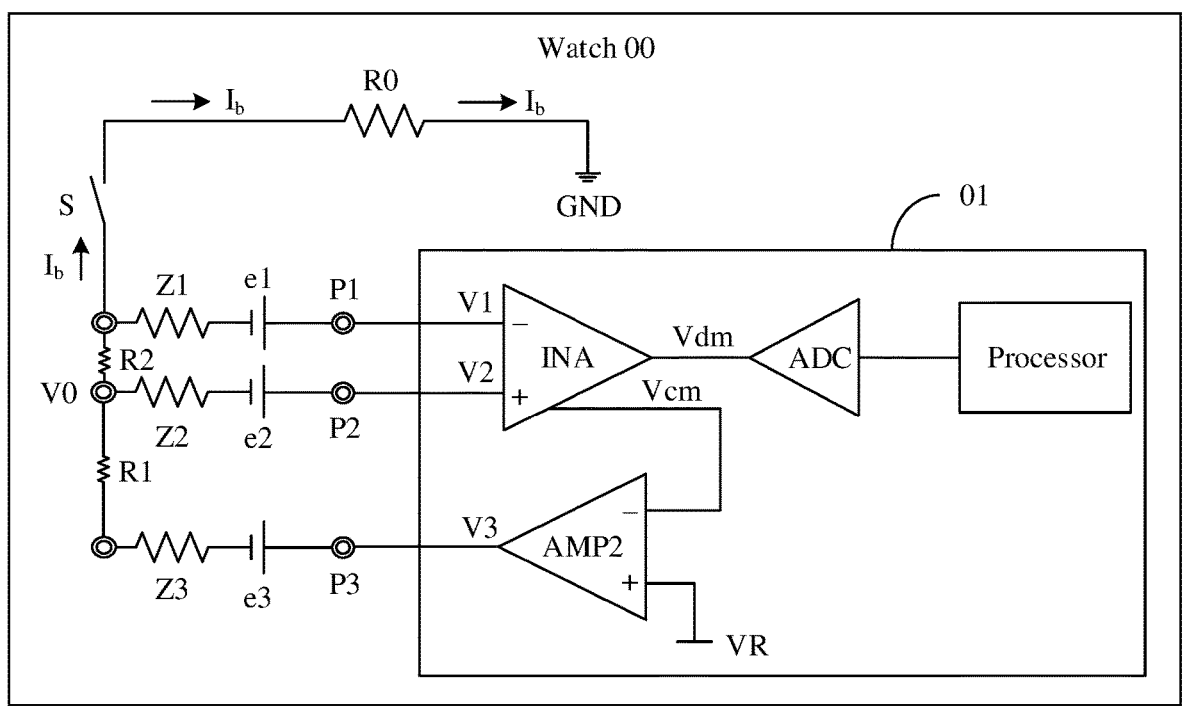
FIG. 6 is an equivalent circuit diagram of another watch having an ECG detection function in the related technology.

FIG. 6 is an equivalent circuit diagram of a watch having an ECG detection function in the related technology. Refer to FIG. 6, for a watch using a positive power supply circuit, if a system positive potential provided by the positive power supply circuit is Vcc, a potential Vref provided by a reference power supply end VR for an in-phase input end of a second operational amplifier AMP2 may be half of the system positive potential Vcc. That is, Vref meets: Vref=Vcc/2. It is assumed that during ECG detection, a potential of an out-of-phase input end of the INA is V1, and a potential of an in-phase input end of the INA is V2, a differential-mode voltage Vdm output by a differential-mode output end of the INA meets: Vdm=V2−V1. A common-mode voltage Vcm output by a common-mode output end of the INA to an out-of-phase input end of the second operational amplifier AMP2 meets: Vcm=(V1+V2)/2.

When the second operational amplifier AMP2 works normally, the in-phase input end and the out-of-phase input end of the second operational amplifier AMP2 are equivalently short-circuited (also referred to as virtual short) together. Therefore, the common-mode voltage Vcm may be approximately equal to the potential Vref provided by the reference power supply end VR, that is, Vcm≈Vref=Vcc/2. That is, even if the potential V1 of the out-of-phase input end and the potential V2 of the in-phase input end of the INA fluctuate, the second operational amplifier AMP2, as a negative feedback circuit, may also adjust a reference potential V3 of an output end of the second operational amplifier AMP2 based on the common-mode voltage Vcm, to adjust V1 and V2. Finally, the common-mode voltage Vcm between the in-phase input end and the out-of-phase input end of the INA may be kept in a range approximately equal to the potential Vref of the reference power supply end VR.

When ECG detection is performed, human skin is in contact with a first electrode P1, a second electrode P2, and a third electrode P3 separately. Therefore, as shown in FIG. 6, a contact impedance Z1 and a half-battery voltage e1 are generated on a contact surface between the human skin and the first electrode P1, and a contact impedance Z2 and a half-battery voltage e2 are generated on a contact surface between the skin and the second electrode P2, a contact impedance Z3 and a half-battery voltage e3 are generated on a contact surface between the skin and the third electrode P3. The electrode is metal, but the skin of the human body is non-metal. Therefore, after the skin is in contact with the electrode, the contact surface between the skin and the electrode interact with each other to generate a voltage, and the voltage is the half-battery voltage.

It is assumed that a potential of the human body is V0 (which is generally approximately equal to Vcc/2 according to an experiment), and an ECG signal generated by the human body and internal resistances R1 and R2 of the human body are ignored. In this case, the potential V1 of the out-of-phase input end of the INA may meet V1=V0+e1, and the potential V2 of the in-phase input end of the INA may meet V2=V0+e2. The reference potential V3 of the output end of the second operational amplifier AMP2 may meet V3=V0+e3.

It can be learned from the foregoing analysis that, when a finger of a user accidentally touches a housing and causes the third electrode P3 to be conducted with the housing, and the housing is grounded, that is, a potential of the housing is 0 V, because a potential of the output end of the second operational amplifier AMP2 is the reference potential V3, there is a potential difference between the output end of the second operational amplifier AMP2 and the housing, and resistance values of both the output end of the second operational amplifier AMP2 and the housing are small, as shown in FIG. 6. A path of a leakage current $I_b$ is formed between the output end of the second operational amplifier AMP2 and the housing. When the leakage current $I_b$ passes through the internal resistance R2 of the human body, a transient voltage is formed between the in-phase input end and the out-of-phase input end of the INA. As a result, a processor detects that a baseline drift occurs in the electrocardiogram. In addition, a larger leakage current $I_b$ indicates a more obvious baseline drift.

In addition, when the user wears the watch, sweat generated by the human body may also cause the third electrode P3 to be conducted to the housing, so that the leakage current $I_b$ is generated between the output end of the second operational amplifier AMP2 and the housing. In this case, an electrochemical reaction occurs under an action of the leakage current $I_b$ on the housing and the electrode that are infiltrated by sweat, or another metal component (for example, a screw) that is infiltrated by sweat and that is electrically connected to the housing, and corrosion occurs. In addition, a larger leakage current $I_b$ indicates a faster corrosion speed.

However, in this embodiment of this disclosure, a voltage holder circuit 30 provides a target potential for the housing 10, so that a potential difference between the potential of the housing 10 and the reference potential V3 provided by an electrocardiogram detection circuit 20 for the third electrode P3 can be small. Therefore, even if the housing 10 is conducted to the third electrode P3 due to an accidental touch of the user or sweat infiltration, no leakage current is generated between the housing 10 and the third electrode P3 or a small leakage current is generated between the housing 10 and the third electrode P3. This can ensure accuracy of ECG detection.

In an implementation of this embodiment of this disclosure, the voltage holder circuit 30 may be a voltage follower circuit. An input end of the voltage follower circuit 30 serves as an input end of the voltage holder circuit and is connected to a potential provider, and an output end of the voltage follower circuit 30 serves as an output end of the voltage holder circuit and is connected to the housing 10. The voltage follower circuit 30 is configured to follow a potential of the input end (connected to the potential provider) of the voltage follower circuit 30, so that a potential of the output end (output to the housing) of the voltage follower circuit 30 is consistent with the potential of the input end as much as possible. In this way, the potential of the housing 10 can be controlled to be substantially consistent with the target potential of the potential provider.

In an implementation, as shown in FIG. 4 and FIG. 5, the potential provider may be the third electrode P3, that is, the output end O2 of the right leg drive sub-circuit 202, or the output end of the second operational amplifier AMP2. Correspondingly, the voltage follower circuit 30 may control the potential of the housing 10 to be substantially consistent with the reference potential V3 of the output end of the second operational amplifier AMP2, that is, the target potential is the reference potential V3.

Figure 7:
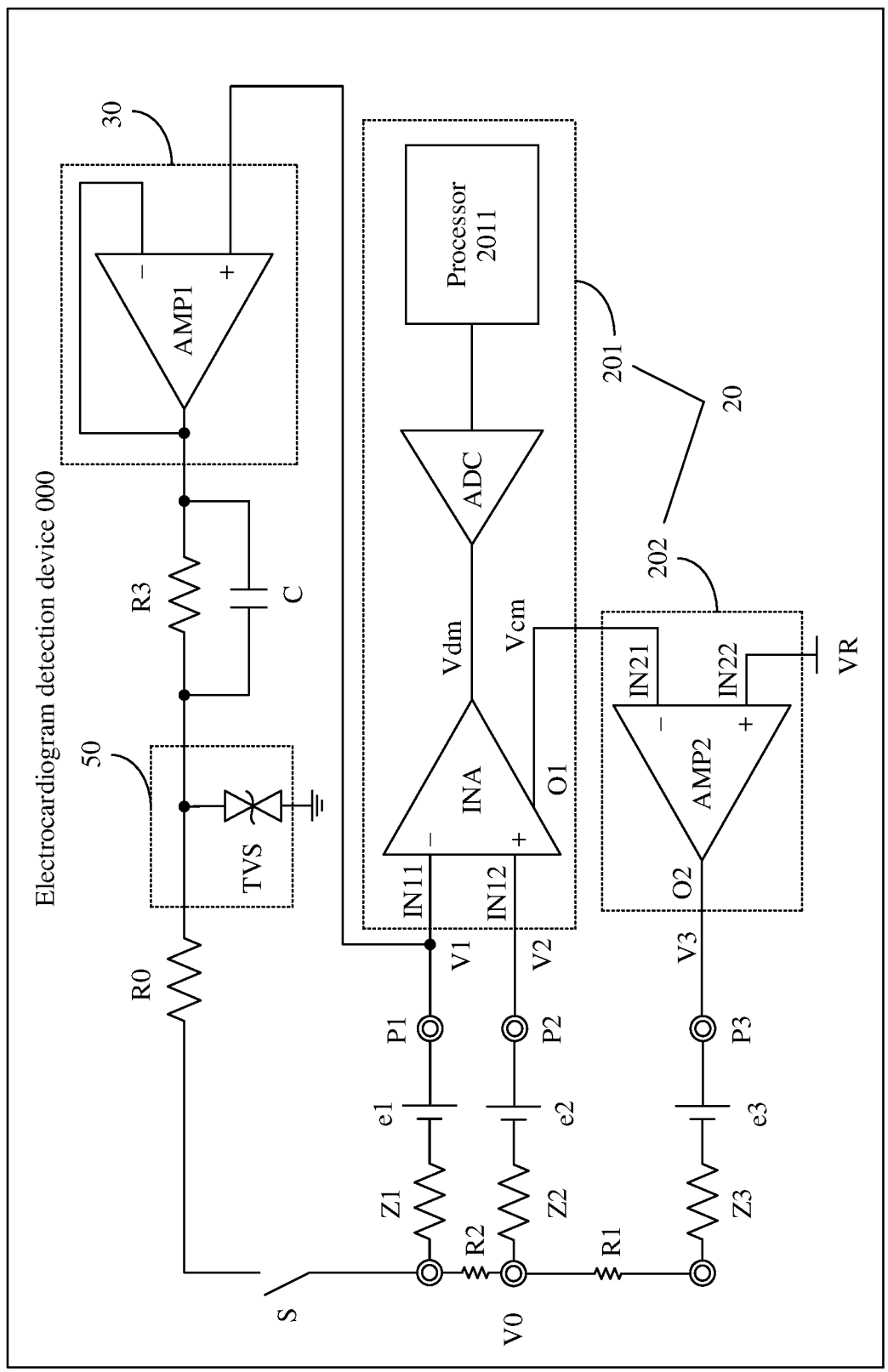
FIG. 7 is an equivalent circuit diagram of still another electrocardiogram detection device according to an embodiment of this disclosure.

Alternatively, as shown in FIG. 7, the potential provider may be the first electrode P1, that is, the first input end IN11 of the detection sub-circuit 201, or the out-of-phase input end of the INA. Correspondingly, the voltage follower circuit 30 may control the potential of the housing 10 to be substantially consistent with the potential of the out-of-phase input end of the INA. That is, the target potential is V1.

Figure 8:
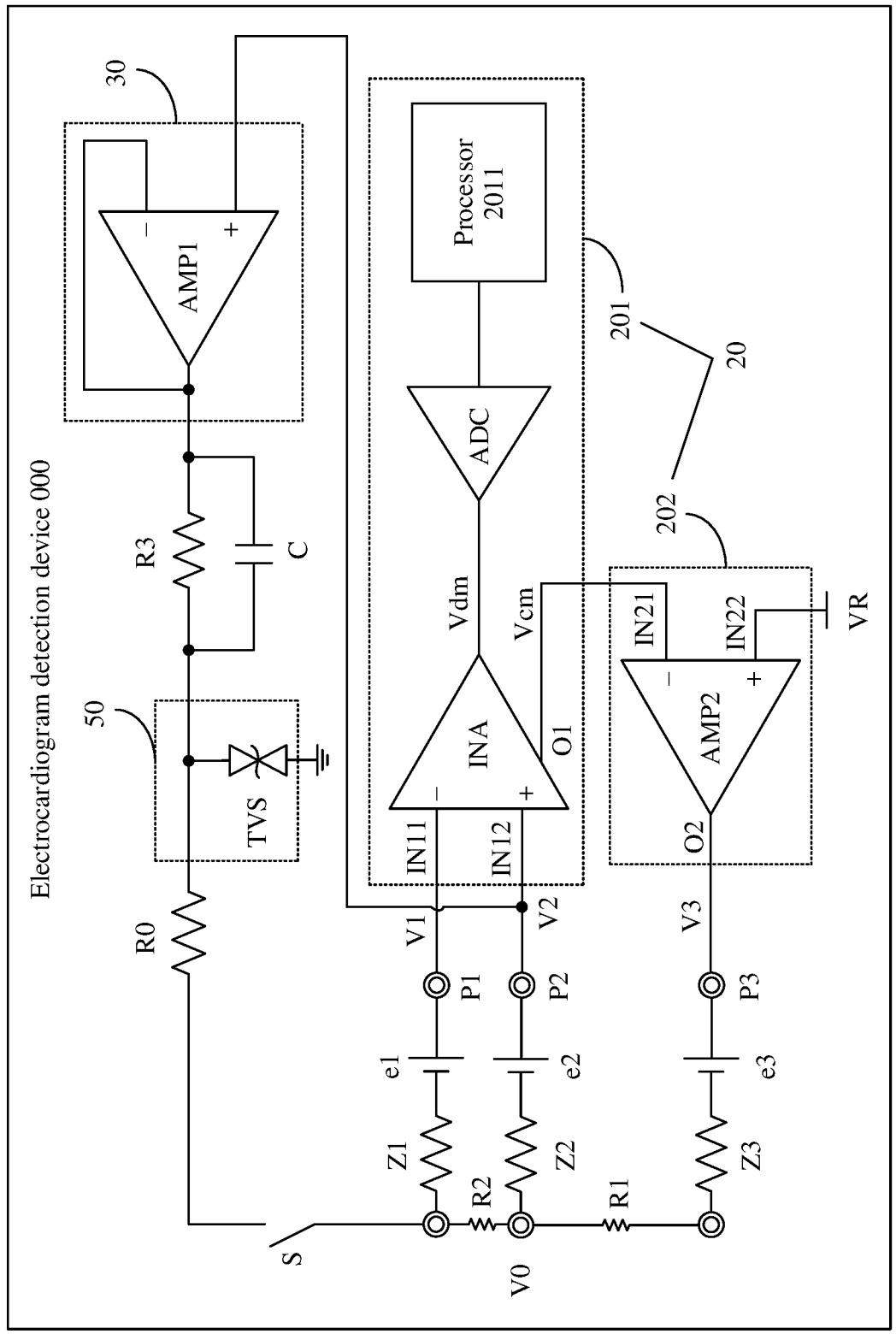
FIG. 8 is an equivalent circuit diagram of still another electrocardiogram detection device according to an embodiment of this disclosure.

Alternatively, as shown in FIG. 8, the potential provider may be the second electrode P2, that is, the second input end IN12 of the detection sub-circuit 201, or the in-phase input end of the INA. Correspondingly, the voltage follower circuit 30 may control the potential of the housing 10 to be substantially consistent with the potential of the in-phase input end of the INA. That is, the target potential is V2.

Figure 9:
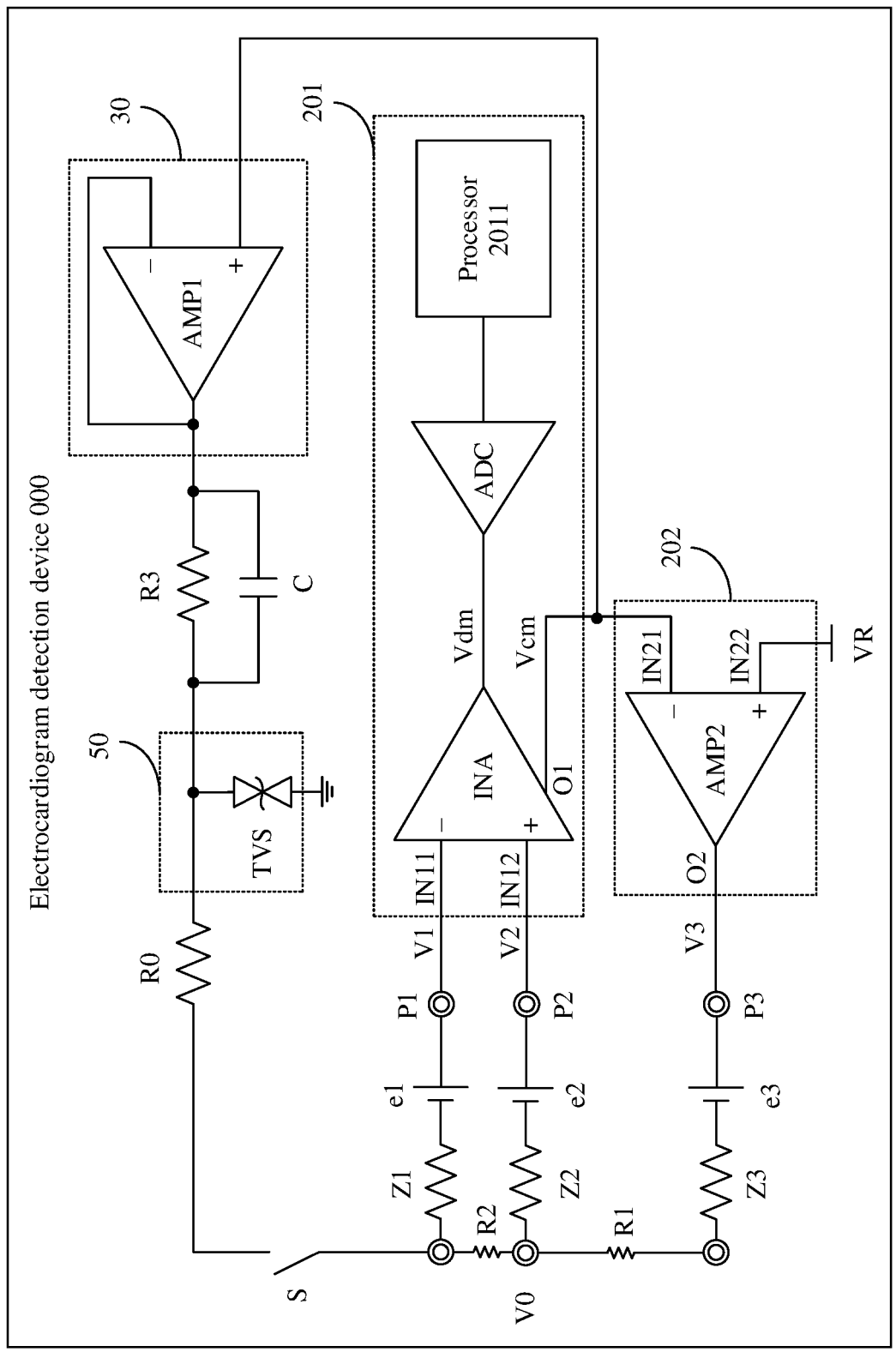
FIG. 9 is an equivalent circuit diagram of still another electrocardiogram detection device according to an embodiment of this disclosure.

Alternatively, as shown in FIG. 9, the potential provider may be the common-mode output end O1 of the detection sub-circuit 201, that is, the common-mode output end of the INA. Correspondingly, the voltage follower circuit 30 may control the potential of the housing 10 to be substantially consistent with the potential of the common-mode output end O1 of the INA. That is, the target potential is Vcm.

Because the common-mode output end of the INA is connected to the out-of-phase input end of the second operational amplifier AMP2, the potential provider may alternatively be the out-of-phase input end of the second operational amplifier AMP2.

In this embodiment of this disclosure, the voltage follower circuit 30 has a voltage following function, so that the potential of the housing 10 can be controlled to be substantially consistent with the target potential of the potential provider. The potential of the housing 10 being controlled to be substantially consistent with the target potential of the potential provider means that the potential difference between the potential of the housing 10 and the target potential of the potential provider is controlled within an error range allowed by engineering specifications. Complete consistency may not be required, and a specific error may be allowed. For example, if a voltage difference between the target potential and the reference potential is a specific value (for example, 10 uv), but a leakage current can be suppressed at this time, and the potential difference meets engineering specification requirements of the product, this design is also acceptable. Generally, an order of magnitude of the error range may be an uv level or an mv level.

When the potential provider is the third electrode P3, that is, when the target potential is the reference potential V3, the potential of the housing 10 is consistent with the potential of the third electrode P3. Therefore, even if the third electrode P3 is conducted to the housing 10, no leakage current is generated between the third electrode P3 and the housing 10. In this case, suppression on the leakage current is better.

Figure 10:
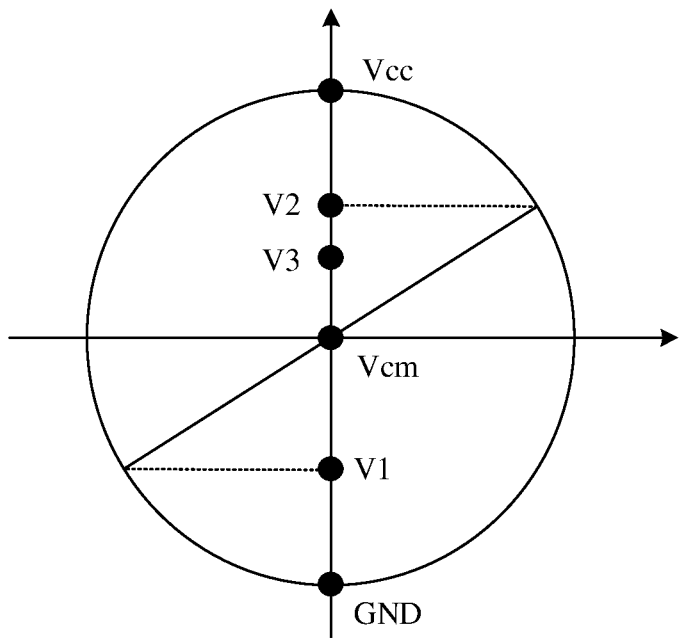
FIG. 10 is a schematic diagram of potentials of terminals in an electrocardiogram detection circuit according to an embodiment of this disclosure.

FIG. 10 is a schematic diagram of potentials of terminals in an electrocardiogram detection circuit according to an embodiment of this disclosure. A longitudinal axis in FIG. 10 represents a potential value, and a horizontal axis has no actual meaning. It can be learned from FIG. 10 and the foregoing analysis that, when a second operational amplifier AMP2 works normally, the second operational amplifier AMP2 serves as a negative feedback circuit, so that a common-mode voltage Vcm output by a common-mode output end O1 of an INA is approximately equal to a potential Vref provided by a reference power supply end VR, and Vref=Vcc/2. Therefore, it can be deduced that the common-mode voltage Vcm meets: Vcm≈Vcc/2. Because the common-mode voltage Vcm output by the common-mode output end O1 of the INA is an average value of a potential V1 of an out-of-phase input end of the INA and a potential V2 of an in-phase input end of the INA, that is, Vcm=(V1+V2)/2. Therefore, it can be deduced that the potential V1 of the out-of-phase input end of the INA and the potential V2 of the in-phase input end of the INA meet: V1+V2=2Vcm=Vcc.

Because both a second electrode P2 and a third electrode P3 are disposed on a first outer surface of the electrocardiogram detection device 000, and shapes of the two electrodes are the same, half-battery voltages e2 and e3 are close. Therefore, a potential difference ΔV1 between the potential V2 and a reference potential V3 is small. Because a first electrode P2 is disposed on a second outer surface of the electrocardiogram detection device 000, and shapes of the first electrode P2 and the third electrode P3 are generally different, there is specific difference between half-battery voltages e1 and e3. Therefore, a potential difference ΔV2 between the potential V1 and the reference potential V3 is slightly greater than ΔV1. Further, because Vcm=(V1+V2)/2, a potential difference ΔV3 between the common-mode voltage Vom and the reference potential V3 is greater than the potential difference ΔV1 and less than the potential difference ΔV2.

Based on the foregoing description, it can be determined that when the potentials of the potential providers are V1, V2, V3, and Vcm respectively, suppression on a leakage current is most effective at the potential V3, with a decreasing effect at the potential V2, then the potential Vcm, and finally the potential V1.

In an implementation, as shown in FIG. 5 and FIG. 7 to FIG. 9, the voltage follower circuit 30 may include a first operational amplifier AMP1. An in-phase input end of the first operational amplifier AMP1 serves as an input end of the voltage follower circuit 30 and may be connected to the potential provider. An output end of the first operational amplifier AMP1 serves as an output end of the voltage follower circuit 30 and may be separately connected to the housing 10 (that is, the equivalent resistance R0 shown in FIG. 5 and FIG. 7 to FIG. 9) and an out-of-phase input end of the first operational amplifier AMP1. The output end of the first operational amplifier AMP1 may be indirectly connected to the housing 10. For example, as shown in FIG. 5 and FIG. 7 to FIG. 9, the output end of the first operational amplifier AMP1 is connected to the housing 10 by using a resistor R3.

The output end of the first operational amplifier AMP1 is connected to the out-of-phase input end, so that a potential of the output end of the first operational amplifier AMP1 changes with a potential of the in-phase input end. That is, voltage following can be implemented. In addition, because an input resistance of the first operational amplifier AMP1 is high (the input resistance is infinite in an ideal case), impact on the potential of the potential provider can be avoided, and it is ensured that a detection sub-circuit 201 and a right leg drive sub-circuit 202 can run normally.

Figure 11:
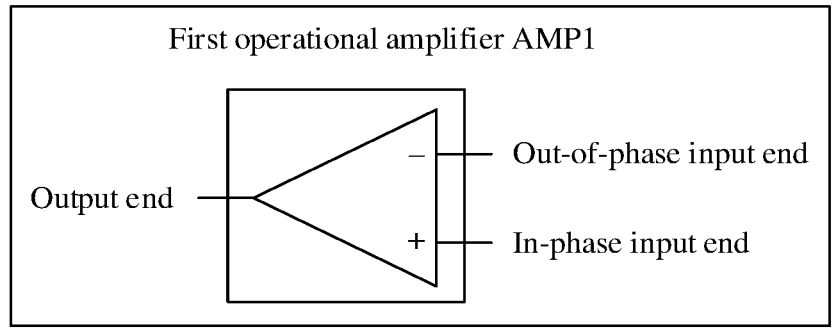
FIG. 11 is a schematic diagram of a structure of a first operational amplifier according to an embodiment of this disclosure.

In an implementation, as shown in FIG. 11, after being closed, the first operational amplifier AMP1 may have three ports in total: an in-phase input end, an out-of-phase input end, and an output end. When the first operational amplifier AMP1 is applied to the electrocardiogram detection device 000, the three ports may be separately connected to corresponding components.

Figure 12:
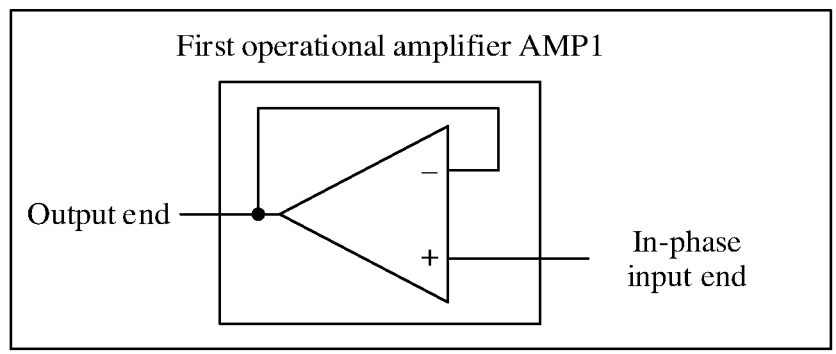
FIG. 12 is a schematic diagram of a structure of another first operational amplifier according to an embodiment of this disclosure.

In another implementation, as shown in FIG. 12, the first operational amplifier AMP1 may also be packaged as a component having only two ports in total: an in-phase input end and an output end. That is, the out-of-phase input end of the first operational amplifier AMP1 is already connected to the output end before packaging. In this implementation, the first operational amplifier AMP1 may also be referred to as a voltage buffer. Correspondingly, when the first operational amplifier AMP1 is applied to the electrocardiogram detection device 000, the in-phase input end and the output end need only to be separately connected to corresponding components.

In an implementation, the voltage follower circuit 30 may include a plurality of cascaded first operational amplifiers AMP1. Alternatively, the voltage follower circuit 30 may include a plurality of cascaded discrete triodes. The plurality of cascaded triodes can implement a function of an operational amplifier, and further implement voltage following. How to specifically use the plurality of cascaded triodes to implement a function of the operational amplifier is a conventional technology in the art, and details are not described in this disclosure.

In this embodiment of this disclosure, each component (such as an AMP or an ADC) is merely used to represent a logic circuit having the function. In an actual product, one or more circuits may be packaged into one chip, to increase integration and reduce a volume. For example, the INA and the second operational amplifier AMP2 in the detection sub-circuit 201 may be integrated into one chip, and the chip may also be referred to as an ECG chip. Pins of the ECG chip may include at least a first input pin (that is, the out-of-phase input end of the INA) configured to connect to the first electrode P1, a second input pin (that is, the in-phase input end of the INA) configured to connect to the second electrode P2, and an output pin (that is, the output end of the AMP2) configured to connect to the third electrode P3. Certainly, the ECG chip may further include other pins, for example, a pin configured to ground, and a pin configured to connect to the reference power supply end VR. The in-phase input end of the first operational amplifier AMP1 may be externally connected to the first input pin, the second input pin, or the output pin of the ECG chip. The first operational amplifier AMP1 is connected to the first input pin, the second input pin, or the output pin of the ECG chip, so that a conventional ECG chip can also be applied to the electrocardiogram detection device provided in this embodiment of this disclosure. This effectively improves compatibility of the electrocardiogram detection device.

Alternatively, the INA, the second operational amplifier AMP2, and the first operational amplifier AMP1 in the detection sub-circuit 201 may all be integrated into an ECG chip. In this case, pins of the ECG chip may further include an output pin configured to connect to the housing 10. The INA, the AMP2, and the AMP1 are all integrated into the ECG chip, so that integration of electronic components in the electrocardiogram detection device can be effectively improved, and a volume of the electronic component can be reduced.

Alternatively, the INA, the second operational amplifier AMP2, the ADC, and the first operational amplifier AMP1 in the detection sub-circuit 201 may all be integrated into an ECG chip.

Alternatively, the INA, the second operational amplifier AMP2, the ADC, a processor 2011, and the first operational amplifier AMP1 in the detection sub-circuit 201 may all be integrated into an ECG chip.

Figure 13:
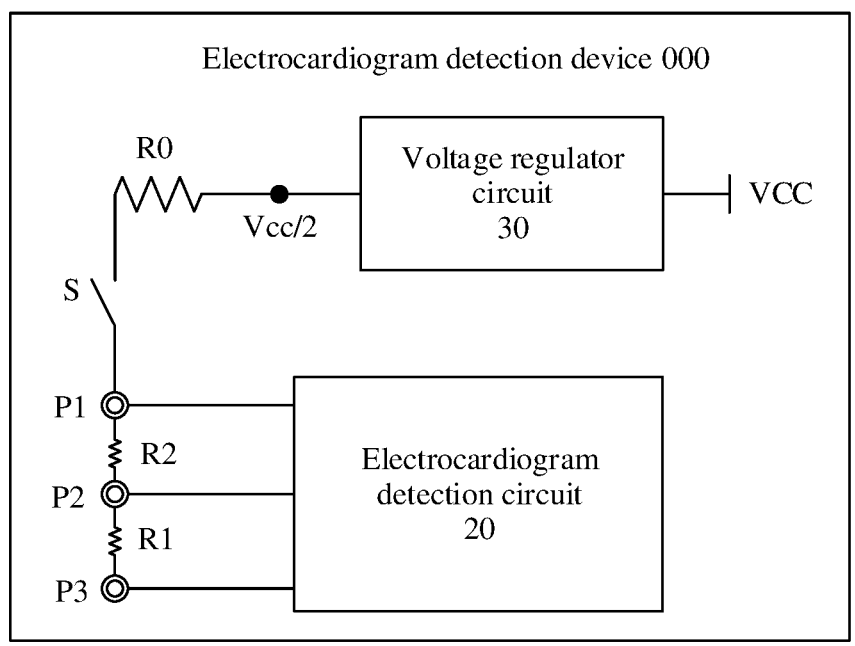
FIG. 13 is an equivalent circuit diagram of still another electrocardiogram detection device according to an embodiment of this disclosure.

Refer to FIG. 13, an embodiment of this disclosure provides another implementation of a voltage holder circuit 30. In this embodiment, the voltage holder circuit 30 is a voltage regulator circuit, and the voltage regulator circuit may also be referred to as a voltage regulator, that is, configured to output a stable voltage when an input changes. An input end of the voltage regulator circuit 30 serves as an input end of the voltage holder circuit and may be connected to a power supply output end VCC. An output end of the voltage regulator circuit 30 serves as an output end of the voltage holder circuit and is connected to the housing 10 (that is, an equivalent resistance R0 shown in FIG. 13). The voltage regulator circuit 30 may be configured to provide the target potential for the housing 10 under driving of the power supply output end VCC.

The voltage regulator circuit 30 is used to provide the target potential. A potential of the power supply output end VCC may be properly designed, so that the target potential provided by the voltage regulator circuit 30 for the housing 10 is approximately equal to the reference potential. This can ensure suppression on a leakage current.

Because a reference potential V3 provided by an electrocardiogram detection circuit 20 for a third electrode P3 is close to a potential Vref of a reference power supply end VR connected to a second operational amplifier AMP2 in the electrocardiogram detection circuit 20, the target potential provided by the voltage regulator circuit 30 for the housing 10 may be equal to the potential Vref of the reference power supply end VR. To be specific, as shown in FIG. 13, the target potential provided by the voltage regulator circuit 30 for the housing 10 may be Vcc/2.

Figure 14:
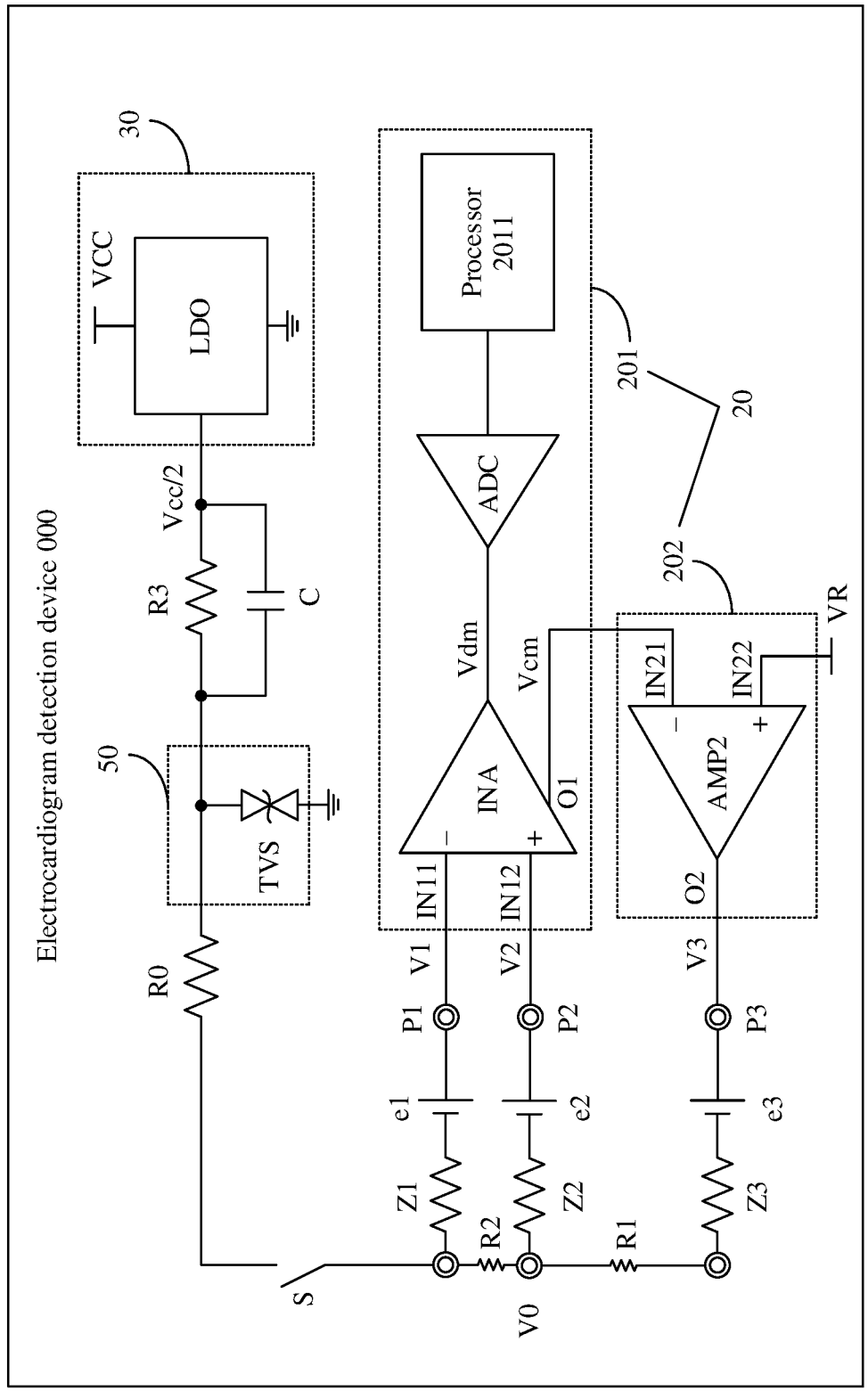
FIG. 14 is an equivalent circuit diagram of still another electrocardiogram detection device according to an embodiment of this disclosure.

FIG. 14 is an equivalent circuit diagram of still another electrocardiogram detection device according to an embodiment of this disclosure. As shown in FIG. 14, the voltage regulator circuit 30 may be an LDO. Compared with a linear regulator, the LDO has advantages such as low noise and a small static current.

In an implementation, refer to FIG. 5, FIG. 7 to FIG. 9, and FIG. 14, the electrocardiogram detection device 000 may further include a resistor R3 disposed in the housing 10 and connected in series between the housing 10 and the output end (for example, an output end of the voltage follower circuit or an output end of the voltage regulator circuit) of the voltage holder circuit 30.

The resistor R3 is connected in series between the housing 10 and the output end of the voltage holder circuit 30, so that a resistance on a path of the leakage current can be further increased, and the leakage current can be effectively reduced. This can further reduces a baseline drift of the ECG as much as possible, and ensure reliability of ECG detection.

As shown in FIG. 5, FIG. 7 to FIG. 9, and FIG. 14, the electrocardiogram detection device 000 may further include a capacitor C disposed in the housing 10 and connected in parallel to the resistor R3. The capacitor C connected in parallel and a resistor R2 may also be referred to as a resistor-capacitor network. The capacitor C can effectively resist electromagnetic interference (EMI) and electrostatic discharge (ESD).

In this embodiment of this disclosure, a resistance value of the resistor R3 and a capacitance value of the capacitor C may be flexibly set based on a requirement of an application scenario. For example, if the electrocardiogram detection device 000 is a wearable device such as a watch or a band, an order of magnitude of a resistance value of the resistor R3 may be a megaohm (MΩ) level, and an order of magnitude of a capacitance value of the capacitor C may be a picofarad (pF) level. For example, a resistance value of the resistor R3 may be 10 MΩ, and a capacitance value of the capacitor C may be 47 pF.

In this embodiment of this disclosure, as shown in FIG. 5, FIG. 7 to FIG. 9, and FIG. 14, the electrocardiogram detection device 000 may further include an ESD circuit 50 disposed in the housing 10. One end of the ESD circuit 50 may be connected to the housing 10, and the other end may be grounded.

The ESD circuit 50 can prevent each component in the electrocardiogram detection device 000 from being damaged due to ESD impact. This can effectively improve ESD performance of the electrocardiogram detection device.

In an implementation, the ESD circuit 50 may include a diode, for example, may include a TVS. One electrode of the TVS may be connected to the housing 10, and the other electrode may be grounded.

As a high-efficiency protection device, the TVS has advantages of a fast response, a high transient power, a small leakage current, a small breakdown voltage deviation, easy control of clamping voltage, no damage limit, and a small size. The TVS can effectively protect each component in the electrocardiogram detection device, and prevent each component from being damaged by a surge pulse.

Figure 15:
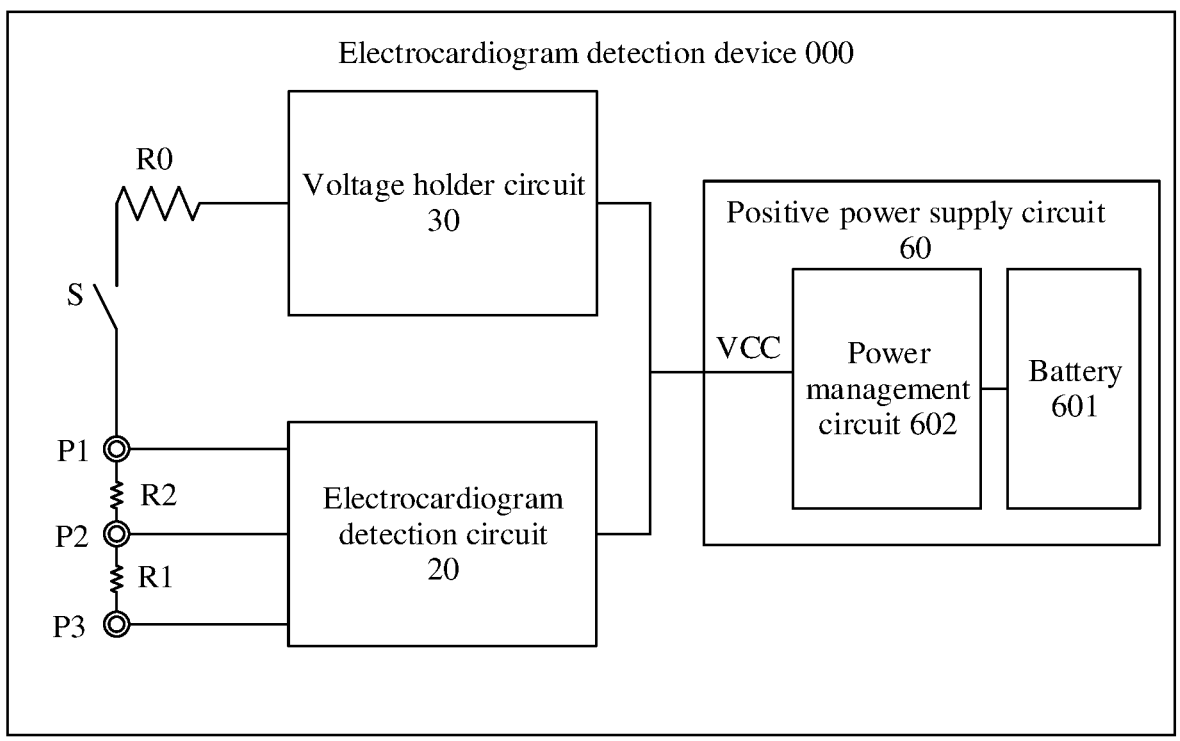
FIG. 15 is an equivalent circuit diagram of still another electrocardiogram detection device according to an embodiment of this disclosure.

In an implementation, as shown in FIG. 15, the electrocardiogram detection device 000 provided in this embodiment of this disclosure may further include a positive power supply circuit 60 disposed in the housing 10. The positive power supply circuit 60 has a power supply output end VCC. The positive power supply circuit 60 may supply power to the electrocardiogram detection circuit 20 and the voltage holder circuit 30 by using the power supply output end VCC.

A circuit (for example, the INA and the second operational amplifier AMP2 shown in FIG. 5, FIG. 7 to FIG. 9, and FIG. 14) that is in the electrocardiogram detection circuit 20 and that is connected before an input end of the ADC may be referred to as an analog front end (AFE). The AFE may amplify a coupled analog signal (that is, an ECG signal), and send the analog signal to the ADC for analog-to-digital conversion processing. The positive power supply circuit 60 provided in this embodiment of this disclosure may provide a single power supply for the AFE in the electrocardiogram detection circuit 20 and the voltage holder circuit 30.

The single power supply means that a type of power supply (for example, a positive power supply) is used to power an analog circuit, to distinguish from dual power supplies formed by positive and negative power supplies. The single power supply is usually powered by a positive power supply. In addition, for ease of implementation, a positive power supply (for example, a 1.8 V power supply or a 2.5 V power supply) is usually used. Certainly, in practice, it is not limited that a plurality of positive power supplies supply power to the analog circuit at the same time. For example, the positive power supply circuit 60 may include two outputs. One outputs Vcc (for example, 1.8 V), and the other outputs Vcc/2.

In this embodiment of this disclosure, a power supply mode of a digital circuit (such as an ADC and a processor) in the electrocardiogram detection circuit 20 is not limited, and various existing power supply modes may be used for power supply. For example, the power supply circuit 60 may alternatively supply power.

In an implementation, as shown in FIG. 15, the positive power supply circuit 60 includes a battery 601 and a power management circuit 602. The power management circuit 602 may be a power management integrated circuit (PMIC). The power management circuit 602 may convert a potential provided by the battery 601 into a system positive potential Vcc, and then output the system positive potential Vcc to the power supply output end VCC. For example, the potential provided by the battery 601 may be 3.8 V. The power management circuit 602 may convert the potential of 3.8 V into 1.8 V or 2.5 V, and then provide the 1.8 V or 2.5 V potential to the power supply output end VCC. That is, the system positive potential Vcc provided by the power supply output end VCC is 1.8 V or 2.5 V.

In this embodiment of this disclosure, the electrocardiogram detection circuit 20 may further include a voltage conversion circuit (not shown in the figure), and the voltage conversion circuit is separately connected to the power supply output end VCC and the reference power supply end VR. The voltage conversion circuit may convert the system positive potential Vcc output by the power supply output end VCC into Vcc/2, and then provide the Vcc/2 to the reference power supply end VR. The voltage conversion circuit may be integrated into an ECG chip. Implementation of the voltage conversion circuit is the conventional technology, and details are not described in this disclosure.

A circuit structure of the positive power supply circuit is simple, and costs are low. Therefore, the positive power supply circuit is used in the electrocardiogram detection device provided in this embodiment of this disclosure. This can effectively reduce complexity of the circuit structure of the electrocardiogram detection device and costs of the entire system.

For example, refer to FIG. 5, FIG. 7 to FIG. 9, and FIG. 14, the positive power supply circuit 60 may provide the system positive potential Vcc for the first operational amplifier AMP1 or the LDO in the voltage holder circuit 30 by using the power supply output end VCC, and provide the system positive potential Vcc for the INA in the electrocardiogram detection circuit 20.

In an implementation, the electrocardiogram detection device 000 provided in this embodiment of this disclosure may be a wearable device. For example, the device may be a wrist-wearing device such as a watch, a band, or an anklet, or may be an armband device, or may be smart glasses or a head-mounted display device.

The wearable device such as the watch or the band is used as the electrocardiogram detection device, so that the user can detect an electrocardiogram signal of the user in real time. This improves flexibility of electrocardiogram signal detection.

Figure 16:
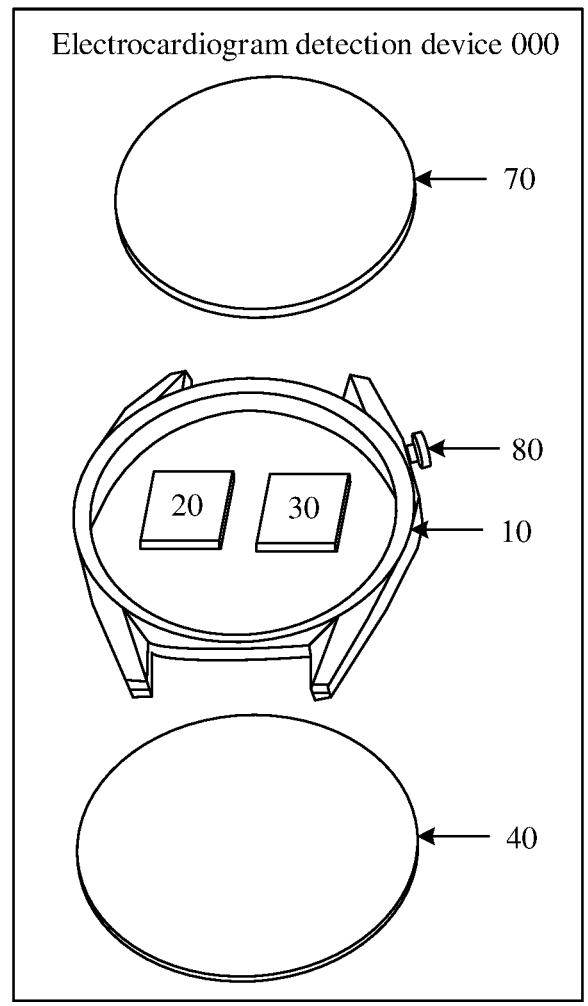
FIG. 16 is a schematic diagram of a structure of another electrocardiogram detection device according to an embodiment of this disclosure.

In a scenario in which the electrocardiogram detection device is a watch or a band, as shown in FIG. 2 and FIG. 16, the housing 10 may be a watch housing (which may also be referred to as a middle frame) of the watch or the band. The watch or the band may further include a bottom cover 40 and a display screen 70. The watch housing 10, the bottom cover 40, and the display screen 70 may form a closed cavity. The electrocardiogram detection circuit 20 and the voltage holder circuit 30 may be disposed in the cavity. The display screen 70 may be a touch display screen.

In addition, the second electrode P2 and the third electrode P3 may be disposed on an outer side of the bottom cover 40, that is, a side that is of the bottom cover 40 and that is away from the display screen 70. The first electrode P1 may be disposed on an outer side of the watch housing 10. For example, refer to FIG. 16, a watch crown 80 may be disposed on an outer side of the watch housing 10, and the first electrode P1 may be disposed on the watch crown 80.

When one hand (for example, the left hand) of the user wears the watch or the band, the second electrode P2 and the third electrode P3 may be in contact with skin of the wrist of the user. When ECG detection needs to be performed, the user may touch the first electrode P1 with a finger of another hand (for example, a finger of the right hand), and the electrocardiogram detection circuit 20 may further collect an electrocardiogram signal of the user by using the first electrode P1 and the second electrode P2.

In conclusion, an embodiment of this disclosure provides an electrocardiogram detection device. A housing of the electrocardiogram detection device may be made of a conductive material. In addition, the electrocardiogram detection device may include a voltage holder circuit configured to provide a target potential for the housing. A potential difference between the target potential provided by the voltage holder circuit and a reference potential provided by the electrocardiogram detection circuit for a third electrode is small. Therefore, in an ECG detection process, even if a user accidentally touches the housing and causes the housing to be conducted to the third electrode, no leakage current is generated between the housing and the third electrode or a small leakage current is generated between the housing and the third electrode. This can effectively reduce interference to an ECG signal and ensure accuracy of ECG detection.

In the solution provided in this embodiment of this disclosure, the potential difference between the housing and the third electrode may be reduced by adding the voltage holder circuit. Therefore, a requirement on insulation performance of the housing of the electrocardiogram detection device can be lowered. In this way, impact of accidental finger touch or sweat infiltration on ECG detection can be effectively reduced without changing a production process of the housing of the entire system and a power supply architecture of the electrocardiogram detection circuit.

Figure 17:
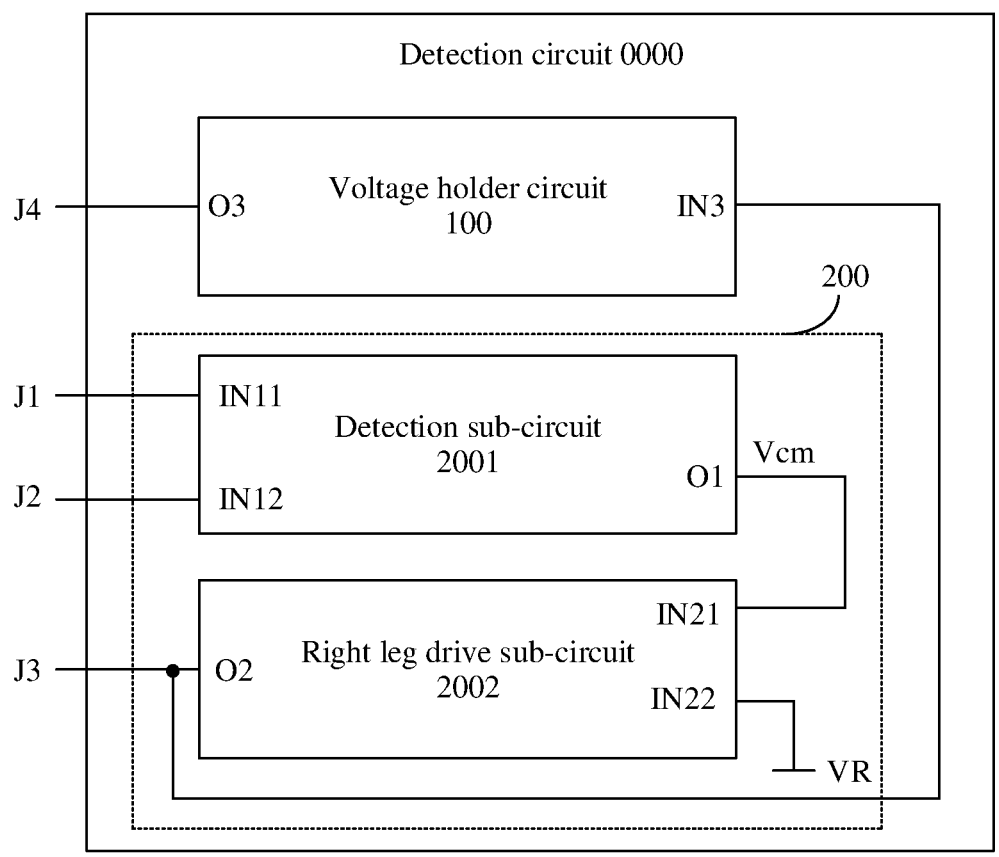
FIG. 17 is a schematic diagram of a structure of a detection circuit applied to an electrocardiogram detection device according to an embodiment of this disclosure.

Based on the foregoing embodiments, an embodiment of this disclosure further provides a detection circuit 0000 applied to an electrocardiogram detection device. The electrocardiogram detection device includes a housing made of a conductive material. As shown in FIG. 17, the detection circuit 0000 includes a first input pin J1, a second input pin J2, a first output pin J3, and a second output pin J4.

The first input pin J1 is configured to connect to a first electrode. The second input pin J2 is configured to connect to a second electrode. The first output pin J3 is configured to connect to a third electrode. The detection circuit 0000 is configured to collect an electrocardiogram signal by using the first input pin J1 and the second input pin J2, and provide a reference potential for the third electrode by using the first output pin J3. The first electrode, the second electrode, and the third electrode are all disposed outside the housing of the electrocardiogram detection device, and are insulated from the housing.

The second output pin J4 is configured to connect to the housing of the electrocardiogram detection device. The detection circuit 0000 is further configured to provide a target potential for the housing by using the second output pin J4. A potential difference between the target potential and the reference potential is less than a difference threshold. For example, the target potential is equal to or close to the reference potential.

In this embodiment of this disclosure, in addition to the pins, the detection circuit 0000 further includes a circuit configured to collect an electrocardiogram signal, a circuit configured to provide a reference potential, and a circuit configured to provide a target potential.

In an implementation, as shown in FIG. 17, the detection circuit 0000 may include a voltage holder circuit 100. An output end O3 of the voltage holder circuit 100 is connected to the second output pin J4. An input end IN3 of the voltage holder circuit 100 is configured to connect to a potential provider. The voltage holder circuit 100 is configured to output the target potential at the output end O3 based on an input signal of the input end IN3.

Figure 18:
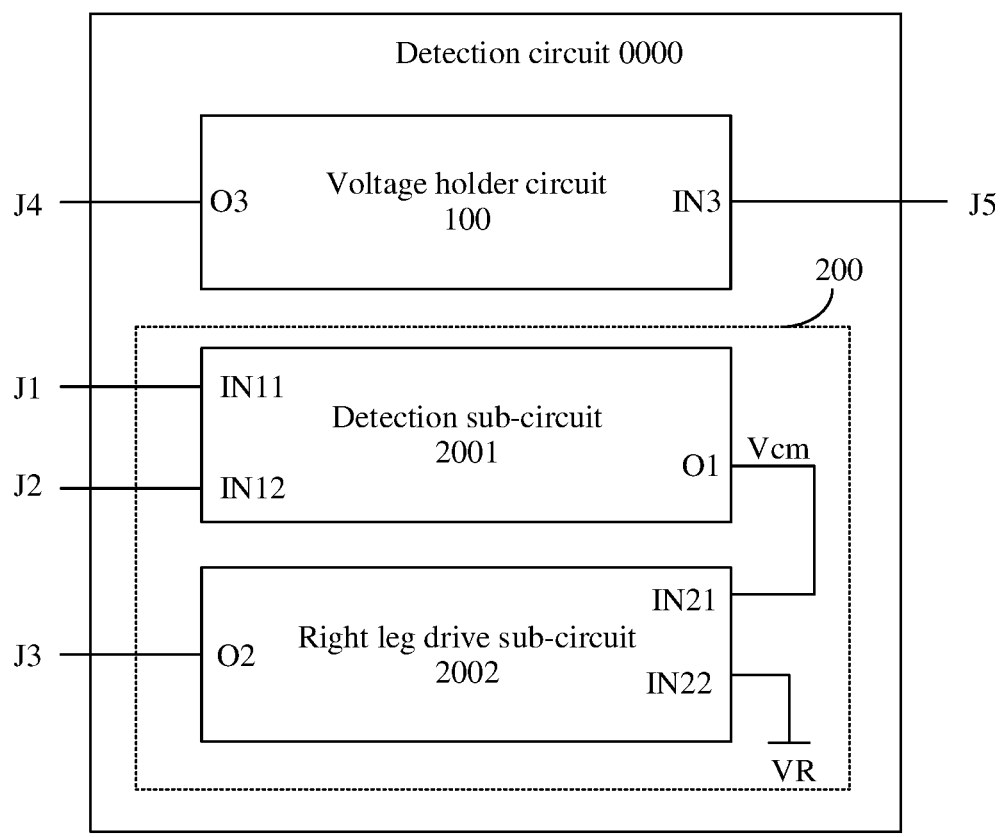
FIG. 18 is a schematic diagram of a structure of another detection circuit applied to an electrocardiogram detection device according to an embodiment of this disclosure.

In an implementation, as shown in FIG. 18, the detection circuit 0000 further includes a power supply pin J5. The power supply pin J5 is configured to connect to a power supply output end VCC. The potential provider connected to the input end IN3 of the voltage holder circuit 100 may be the first electrode, or the second electrode, or the third electrode, or the power supply output end VCC.

In an implementation, the potential provider is the first electrode, or the second electrode, or the third electrode. The voltage holder circuit 100 is a voltage follower circuit. An output end O3 of the voltage follower circuit 100 serves as the output end of the voltage holder circuit and is connected to the second output pin J4, and an input end IN3 of the voltage follower circuit 100 is configured to connect to the potential provider. For example, the input end IN3 of the voltage follower circuit 100 shown in FIG. 7 serves as the input end of the voltage holder circuit and is connected to the first output pin J3. That is, the input end IN3 of the voltage follower circuit 100 is configured to connect to the third electrode. The voltage follower circuit 100 is configured to control a potential of the second output pin J4 to be substantially consistent with the target potential of the potential provider.

Still refer to FIG. 17, the detection circuit 0000 further includes an electrocardiogram detection circuit 200. The electrocardiogram detection circuit 200 may include a detection sub-circuit 2001 and a right leg drive sub-circuit 2002. A first input end IN11 of the detection sub-circuit 2001 is connected to the first input pin J1. A second input end IN12 of the detection sub-circuit 2001 is connected to the second input pin J2. A common-mode output end O1 of the detection sub-circuit 2001 is connected to a first input end IN21 of the right leg drive circuit 2002. The detection sub-circuit 2001 is configured to collect an electrocardiogram signal, output a common-mode voltage between the first input end IN11 and the second input end IN12 to the right leg drive sub-circuit 2002.

A second input end IN22 of the right leg drive sub-circuit 2002 is connected to a reference power supply end VR. An output end O2 of the right leg drive sub-circuit 2002 is connected to the first output pin J3. The right leg drive sub-circuit 2002 is configured to provide the reference potential for the first output pin J3 under driving of the common-mode voltage and the reference power supply end VR.

Alternatively, the potential provider connected to the input end IN3 of the voltage follower circuit 100 may be the common-mode output end O1 of the detection sub-circuit 2001.

A structure of the detection sub-circuit 2001 may be the same as a structure of the detection sub-circuit 201 in the foregoing embodiment, and a structure of the right leg drive sub-circuit 2002 may be the same as a structure of the right leg drive sub-circuit 202 in the foregoing embodiment. Therefore, details are not described herein again.

In an implementation, the detection circuit 0000 may further include a voltage conversion circuit, and the voltage conversion circuit is separately connected to the power supply pin J5 and the reference power supply end VR. The voltage conversion circuit may convert the system positive potential Vcc output by the power supply output end VCC connected to the power supply pin J5 into Vcc/2, and then provide the Vcc/2 to the reference power supply end VR.

In an implementation, the voltage follower circuit 100 may include a first operational amplifier AMP1. An in-phase input end of the first operational amplifier AMP1 serves as the input end of the voltage follower circuit 100 and is connected to the potential provider. An output end of the first operational amplifier AMP1 serves as the output end of the voltage follower circuit 100 and is separately connected to the second output pin J4 and an out-of-phase input end of the first operational amplifier AMP1. For a structure of the voltage follower circuit 100, refer to the foregoing embodiment. Details are not described herein again.

In another implementation, the potential provider is the power supply output end VCC. The voltage holder circuit 100 is a voltage regulator circuit. As shown in FIG. 18, an input end IN3 of the voltage regulator circuit 100 serves as the input end of the voltage holder circuit and is connected to the power supply pin J5. An output end O3 of the voltage regulator circuit 100 serves as the output end of the voltage holder circuit and is connected to the second output pin J4. The voltage regulator circuit 100 is configured to provide the target potential for the second output pin J4 under driving of the power supply output end VCC connected to the power supply pin J5. The voltage regulator circuit may be an LDO.

Figure 19:
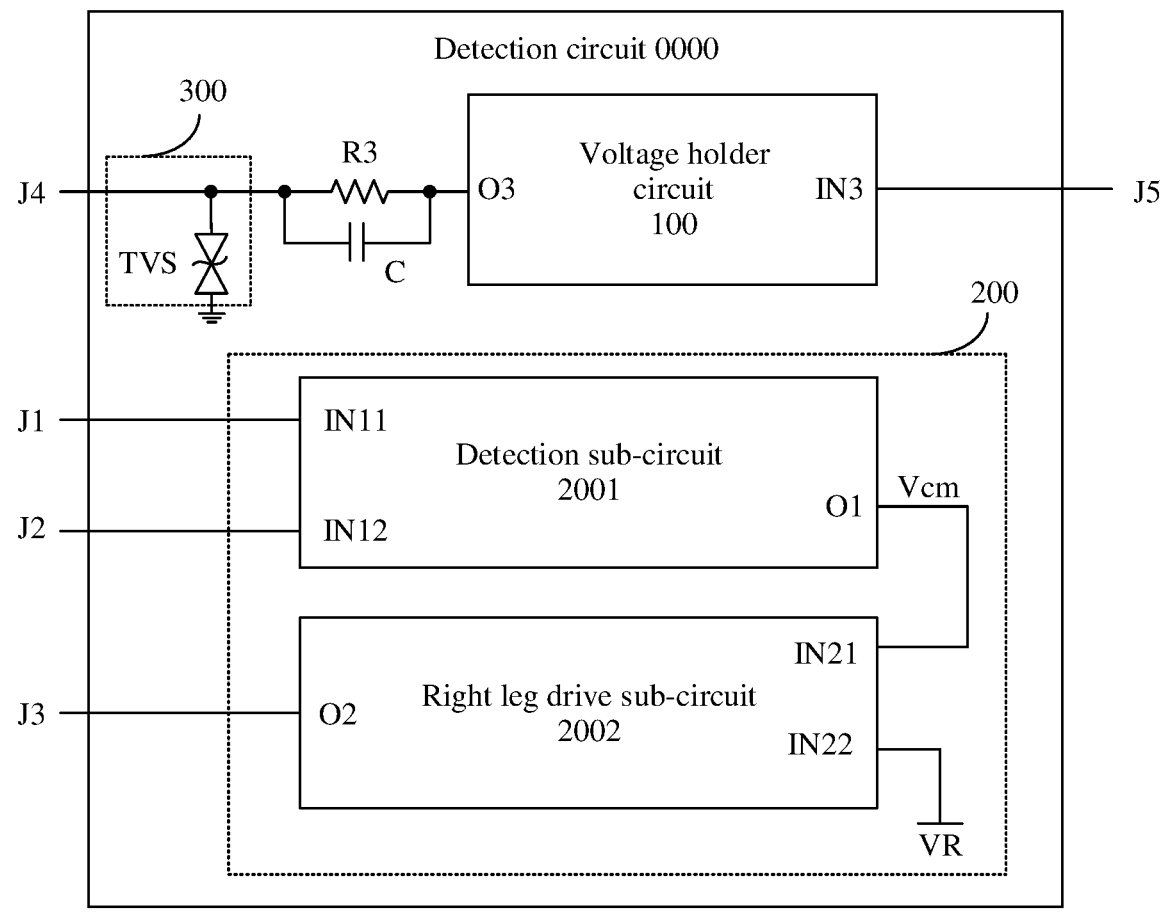
FIG. 19 is a schematic diagram of a structure of still another detection circuit applied to an electrocardiogram detection device according to an embodiment of this disclosure.

In this embodiment of this disclosure, as shown in FIG. 19, the detection circuit 0000 may further include a resistor R3 connected in series between the second output pin J4 and the voltage holder circuit 100.

In an implementation, the detection circuit 0000 further includes a capacitor C connected in parallel to the resistor R3.

In an implementation, the detection circuit 0000 further includes an ESD circuit 300. One end of the ESD circuit 300 is connected to the second output pin J4, and the other end is grounded.

In an implementation, the ESD circuit 300 includes a TVS. One electrode of the TVS is connected to the second output pin J4, and the other electrode of the TVS is grounded.

For functions of the resistor R3, the capacitor C, and the TVS in the ESD circuit 300, refer to the foregoing embodiment. Details are not described herein again.

In an implementation, the detection circuit may be an integrated circuit (IC), and circuits included in the detection circuit may be packaged in a single chip. Because a volume of the packaged chip is small, an increase in a volume of an electrocardiogram detection device using the chip can be avoided. That is, the detection circuit may be applied to a small electrocardiogram detection device.

In conclusion, an embodiment of this disclosure provides a detection circuit applied to an electrocardiogram detection device. A potential difference between a target potential provided by the detection circuit for a housing of the electrocardiogram detection device and a reference potential provided for a third electrode of the electrocardiogram detection device is small. Therefore, in an ECG detection process, even if a user accidentally touches the housing and causes the housing to be conducted to the third electrode, no leakage current is generated between the housing and the third electrode or a small leakage current is generated between the housing and the third electrode. This can effectively reduce interference to an ECG signal and ensure accuracy of ECG detection.

The foregoing descriptions are merely optional embodiments of this disclosure, but are not intended to limit this disclosure. Any modification or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. An electrocardiogram detection device comprising:
   a housing made of a conductive material, an electrocardiogram detection circuit and a voltage holder circuit that are disposed in the housing, and
   a first electrode, a second electrode, and a third electrode that are exposed on an outer surface of the housing and insulated from the housing; wherein:
   the electrocardiogram detection circuit is separately connected to the first electrode, the second electrode, and the third electrode, and the electrocardiogram detection circuit is configured to collect an electrocardiogram signal by using the first electrode and the second electrode, and provide a reference potential for the third electrode; and
   the voltage holder circuit is connected to the housing, and is configured to provide a target potential for the housing, wherein a potential difference between the target potential and the reference potential is less than a difference threshold;
   wherein an output end of the voltage holder circuit is connected to the housing, an input end of the voltage holder circuit is connected to a potential provider, and the voltage holder circuit is configured to output the target potential at the output end based on an input signal of the input end;
   wherein the potential provider is a power supply output end, and the voltage holder circuit is a voltage regulator circuit; and
   an input end of the voltage regulator circuit serves as the input end of the voltage holder circuit and is connected to the power supply output end, an output end of the voltage regulator circuit serves as the output end of the voltage holder circuit and is connected to the housing, and the voltage regulator circuit is configured to provide the target potential for the housing under driving of the power supply output end.

2. The electrocardiogram detection device according to claim 1, wherein the voltage regulator circuit is a low dropout regulator.

3. The electrocardiogram detection device according to claim 1, wherein the target potential is equal to or close to the reference potential.

4. The electrocardiogram detection device according to claim 1, wherein the device further comprises a resistor connected in series between the housing and the voltage holder circuit.

5. The electrocardiogram detection device according to claim 4, wherein the device further comprises a capacitor connected in parallel to the resistor.

6. The electrocardiogram detection device according to claim 1, wherein the device further comprises an electrostatic discharge circuit; and
   one end of the electrostatic discharge circuit is connected to the housing, and another end of the electrostatic discharge circuit is grounded.

7. The electrocardiogram detection device according to claim 6, wherein the electrostatic discharge circuit comprises a transient voltage suppressor; and
   a first end of the transient voltage suppressor is connected to the housing, and a second end of the transient voltage suppressor is grounded.

8. The electrocardiogram detection device according to claim 1, wherein the electrocardiogram detection circuit comprises a detection sub-circuit and a right leg drive sub-circuit;
   a first input end of the detection sub-circuit is connected to the first electrode, a second input end of the detection sub-circuit is connected to the second electrode, a common-mode output end of the detection sub-circuit is connected to a first input end of the right leg drive sub-circuit, and the detection sub-circuit is configured to collect the electrocardiogram signal, and output a common-mode voltage between the first input end and the second input end to the right leg drive sub-circuit; and
   a second input end of the right leg drive sub-circuit is connected to a reference power supply end, an output end of the right leg drive sub-circuit is connected to the third electrode, and the right leg drive sub-circuit is configured to provide the reference potential for the third electrode under driving of the common-mode voltage and the reference power supply end, wherein
   the potential provider is the third electrode, or the second electrode, or the first electrode, or the common-mode output end.

9. The electrocardiogram detection device according to claim 8, wherein the detection sub-circuit comprises an instrumentation amplifier, an analog-to-digital converter, and a processor; and the right leg drive sub-circuit comprises a second operational amplifier;

an out-of-phase input end of the instrumentation amplifier serves as the first input end of the detection sub-circuit and is connected to the first electrode, an in-phase input end of the instrumentation amplifier serves as the second input end of the detection sub-circuit and is connected to the second electrode, a common-mode output end of the instrumentation amplifier serves as the common-mode output end of the detection sub-circuit and is connected to an out-of-phase input end of the second operational amplifier, a differential-mode output end of the instrumentation amplifier is connected to an input end of the analog-to-digital converter, and the out-of-phase input end of the second operational amplifier is the first input end of the right leg drive sub-circuit;

an output end of the analog-to-digital converter is connected to the processor; and an in-phase input end of the second operational amplifier serves as the second input end of the right leg drive sub-circuit and is connected to the reference power supply end, and an output end of the second operational amplifier serves as the output end of the right leg drive sub-circuit and is connected to the third electrode.

10. The electrocardiogram detection device according to claim 1, wherein the device further comprises a positive power supply circuit disposed in the housing, wherein the positive power supply circuit has the power supply output end, and the positive power supply circuit is configured to supply power to the electrocardiogram detection circuit and the voltage holder circuit by using the power supply output end.

11. The electrocardiogram detection device according to claim 1, wherein the electrocardiogram detection device is a wearable device.

12. The electrocardiogram detection device according to claim 11, wherein the wearable device is a watch or a band.

13. A detection circuit applied to an electrocardiogram detection device, the electrocardiogram detection device comprising a first electrode, a second electrode, a third electrode, and a housing made of a conductive material, and the detection circuit comprising:

a first input pin, a second input pin, a first output pin, and a second output pin; wherein: the first input pin is configured to connect to the first electrode, the second input pin is configured to connect to the second electrode, the first output pin is configured to connect to the third electrode, the detection circuit further comprises circuitry that is configured to collect an electrocardiogram signal by using the first input pin and the second input pin, and provide a reference potential for the third electrode by using the first output pin, and the first electrode, the second electrode, and the third electrode are all exposed on an outer surface of the housing and insulated from the housing; and the second output pin is configured to connect to the housing, and the circuitry of the detection circuit is further configured to provide a target potential for the housing by using the second output pin, wherein a potential difference between the target potential and the reference potential is less than a difference threshold;

wherein the circuitry of the detection circuit comprises a voltage holder circuit, an output end of the voltage holder circuit is connected to the second output pin, an input end of the voltage holder circuit is configured to connect to a potential provider, and the voltage holder circuit is configured to output the target potential at the output end based on an input signal of the input end;

wherein the potential provider is the power supply output end, and the voltage holder circuit is a voltage regulator circuit; and an input end of the voltage regulator circuit serves as the input end of the voltage holder circuit and is connected to the power supply output end, an output end of the voltage regulator circuit serves as the output end of the voltage holder circuit and is connected to the housing, and the voltage regulator circuit is configured to provide the target potential for the housing under driving of the power supply output end.

14. The detection circuit according to claim 13, wherein the target potential is equal to or close to the reference potential.

15. An electrocardiogram detection device comprising:

a housing made of a conductive material, an electrocardiogram detection circuit and a voltage holder circuit that are disposed in the housing, and a first electrode, a second electrode, and a third electrode that are exposed on an outer surface of the housing and insulated from the housing; wherein:

the electrocardiogram detection circuit is separately connected to the first electrode, the second electrode, and the third electrode, and the electrocardiogram detection circuit is configured to collect an electrocardiogram signal by using the first electrode and the second electrode, and provide a reference potential for the third electrode; and the voltage holder circuit is connected to the housing, and is configured to provide a target potential for the housing, wherein a potential difference between the target potential and the reference potential is less than a difference threshold;

wherein an output end of the voltage holder circuit is connected to the housing, an input end of the voltage holder circuit is connected to a potential provider, and the voltage holder circuit is configured to output the target potential at the output end based on an input signal of the input end;

wherein the potential provider is the third electrode, or the second electrode, or the first electrode, and the voltage holder circuit is a voltage follower circuit; and an output end of the voltage follower circuit serves as the output end of the voltage holder circuit and is connected to the housing, an input end of the voltage follower circuit serves as the input end of the voltage holder circuit and is connected to the potential provider, and the voltage follower circuit is configured to control a potential of the housing to be substantially consistent with the target potential of the potential provider.

16. The electrocardiogram detection device according to claim 15, wherein the voltage follower circuit comprises a first operational amplifier; and an in-phase input end of the first operational amplifier serves as the input end of the voltage follower circuit and is connected to the potential provider, and an output end of the first operational amplifier serves as the output end of the voltage follower circuit and is separately connected to the housing and an out-of-phase input end of the first operational amplifier.

17. The electrocardiogram detection device according to claim 15, wherein the target potential is equal to or close to the reference potential.

18. The electrocardiogram detection device according to claim 15, wherein the device further comprises a resistor connected in series between the housing and the voltage holder circuit.

19. The electrocardiogram detection device according to claim 18, wherein the device further comprises a capacitor connected in parallel to the resistor.

20. The electrocardiogram detection device according to claim 15, wherein the device further comprises an electrostatic discharge circuit; and
   one end of the electrostatic discharge circuit is connected to the housing, and another end of the electrostatic discharge circuit is grounded.

\* \* \* \* \*